(12) United States Patent
Davis

(10) Patent No.: US 7,655,150 B2
(45) Date of Patent: *Feb. 2, 2010

(54) METHOD AND APPARATUS FOR PROGRAMABLY TREATING WATER IN A WATER COOLER

(75) Inventor: Kenneth A. Davis, Mandeville, LA (US)

(73) Assignee: S.I.P. Technologies L.L.C., New Orleans, LA (US)

(*) Notice: Subject to any disclaimer, the term of this patent is extended or adjusted under 35 U.S.C. 154(b) by 130 days.

This patent is subject to a terminal disclaimer.

(21) Appl. No.: 11/842,476

(22) Filed: Aug. 21, 2007

(65) Prior Publication Data

US 2009/0101594 A1 Apr. 23, 2009

Related U.S. Application Data

(63) Continuation of application No. 11/535,754, filed on Sep. 27, 2006, now Pat. No. 7,258,803, which is a continuation-in-part of application No. 11/109,913, filed on Apr. 20, 2005, now Pat. No. 7,114,637, said application No. 11/535,754 is a continuation-in-part of application No. PCT/US2005/014118, filed on Apr. 21, 2005.

(60) Provisional application No. 60/564,178, filed on Apr. 21, 2004.

(51) Int. Cl.
*C02F 1/78* (2006.01)

(52) U.S. Cl. .................. 210/760; 210/138; 222/52; 222/146.6; 62/389

(58) Field of Classification Search .............. 222/146.6, 222/190, 146.1, 52, 146.5, 185.1; 210/138–140, 210/760; 62/389
See application file for complete search history.

(56) References Cited

U.S. PATENT DOCUMENTS

| | | | |
|---|---|---|---|
| 3,382,980 A | 5/1968 | Silva | |
| 3,726,404 A | 4/1973 | Troglione | |
| 3,843,521 A | 10/1974 | Zeff | |
| 4,193,949 A | 3/1980 | Naito | |
| 4,341,641 A | 7/1982 | Novak | |
| 4,599,166 A | 7/1986 | Gesslauer | |
| 4,752,389 A | 6/1988 | Burrows | |
| 4,767,528 A | 8/1988 | Sasaki et al. | |
| 5,328,059 A | 7/1994 | Campbell | |
| 5,366,619 A | 11/1994 | Matsui et al. | |
| 5,683,576 A | 11/1997 | Olsen | |
| 6,085,540 A | 7/2000 | Davis | |
| 6,182,453 B1 | 2/2001 | Forsberg | |
| 6,289,690 B1 | 9/2001 | Davis | |
| 6,389,690 B1 | 5/2002 | McCullough | |
| 6,532,760 B2 | 3/2003 | Davis | |
| 6,561,382 B2 | 5/2003 | Shelton | |
| 7,114,637 B2 | 10/2006 | Davis | |
| 7,258,803 B2 | 8/2007 | Davis | |
| 7,422,684 B1* | 9/2008 | Davis et al. | ................. 210/192 |
| 2003/0156978 A1* | 8/2003 | Gillette et al. | ................. 422/31 |

FOREIGN PATENT DOCUMENTS

| | | |
|---|---|---|
| JP | HEI 3-55479 | 3/1991 |
| WO | WO 02/102706 | 12/2002 |

* cited by examiner

*Primary Examiner*—Frederick C. Nicolas
(74) *Attorney, Agent, or Firm*—Garvey, Smith, Nehrbass & North, L.L.C.; Charles C. Garvey, Jr.

(57) ABSTRACT

An apparatus for a programmable self sanitizing water dispenser apparatus with a digital computer as well as a programmable method for generating ozone for cleaning the reservoir and the water contained within it.

20 Claims, 31 Drawing Sheets

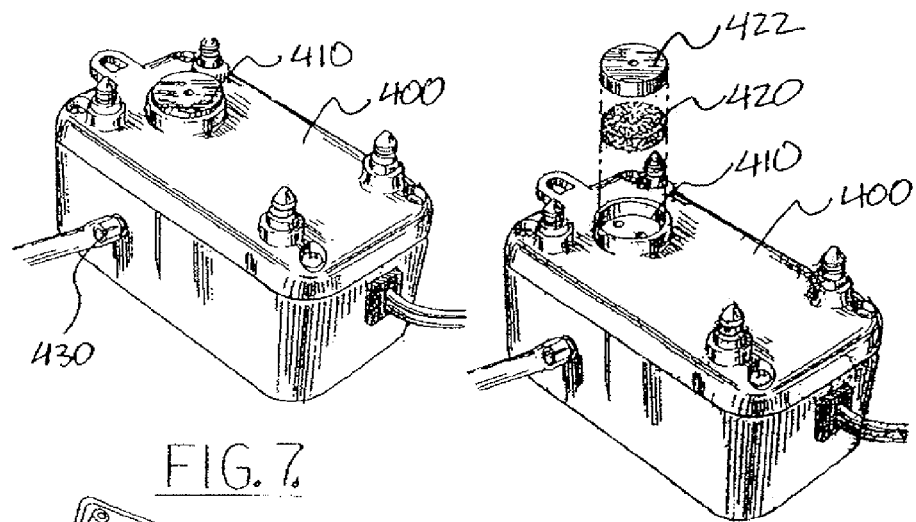
FIG. 7.
FIG. 8.
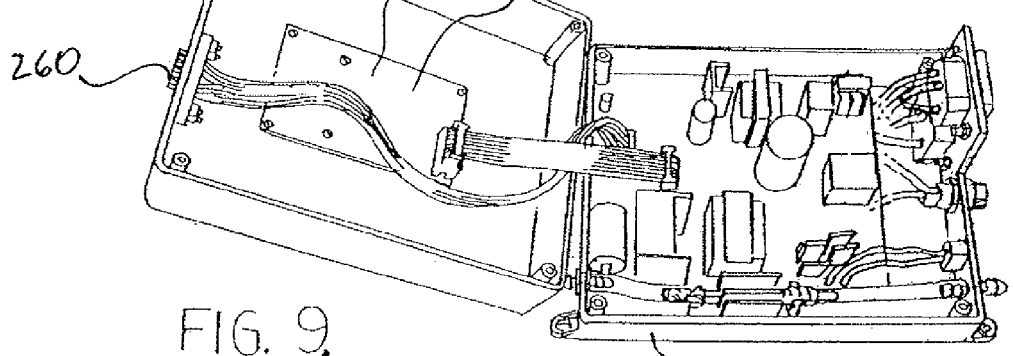
FIG. 9.
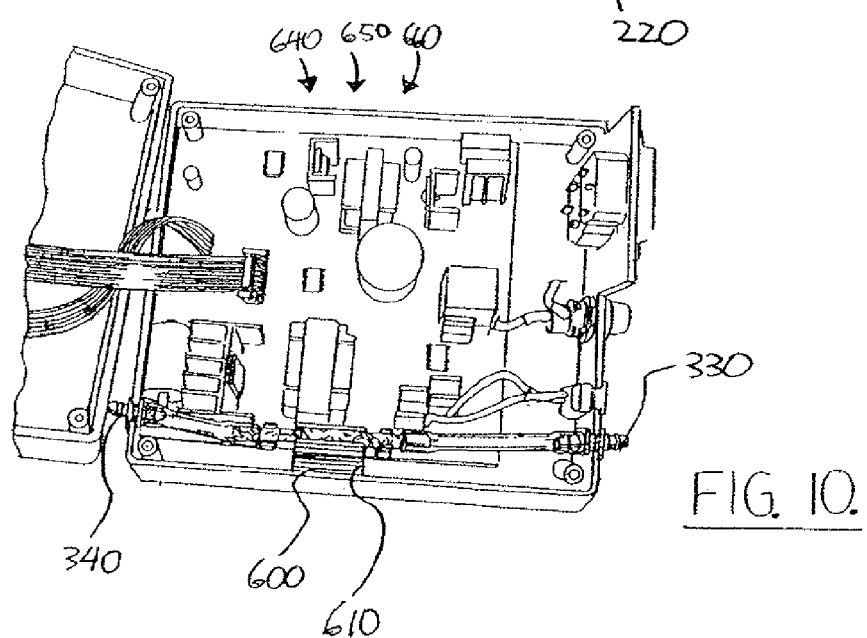
FIG. 10.

METHOD AND APPARATUS FOR PROGRAMABLY TREATING WATER IN A WATER COOLER

CROSS-REFERENCE TO RELATED APPLICATIONS

This is a continuation of U.S. Ser. No. 11/535,754, filed 27 Sep. 2006 (now U.S. Pat. No. 7,258,803) which was a continuation in part of U.S. Ser. No. 11/109,913, filed 20 Apr. 2005, (issuing as U.S. Pat. No. 7,114,637 on Oct. 3, 2006), which claimed priority to U.S. Provisional patent application No. 60/564,178 filed 21 Apr. 2004. Priority of each of these applications is hereby claimed and they are incorporated herein by reference.

This is a continuation of U.S. Ser. No. 11/535,754, filed 27 Sep. 2006 (now U.S. Pat. No. 7,258,803) which was a continuation in part of Patent Cooperation Treaty Application No. PCT/US2005/014118, filed 21 Apr. 2005, incorporated herein by reference and priority of which is claimed.

Patent Cooperation Treaty Application No. PCT/US02/19158, international filing date 17 Jun. 2002, is incorporated herein by reference.

Priority of U.S. Provisional patent application No. 60/564,178, filed 21 Apr. 2004, is hereby claimed and is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

The present invention relates to a method and apparatus for programably treating water (preferably refrigerated) in a water cooler and more particularly to an improved method and apparatus for sanitizing water that is to be dispensed from a water cooler of the type having a cabinet with one or more spigots from a reservoir water supply that is hidden inside the cabinet.

There are several types of cabinet type water dispensers in use today. One of the most common types of such water dispensers is a floor standing cabinet having an open top that receives a large inverted bottle. The bottle is typically of a plastic or glass material having a constricted neck. The bottle is turned upside down and placed on the top of the cabinet with the neck of the bottle extending into a water filled reservoir so that the water seeks its own level in the reservoir during use. As a user draws water from a spigot dispenser, the liquid level in the reservoir drops until it falls below the neck of the bottle at which time water flows from the bottle and bubbles enter the bottle until pressure has equalized. Inverted bottle type water dispensers are sold by a number of companies in the United States and elsewhere. Many are refrigerated.

Other types of water dispensers have an outer cabinet that contains a reservoir or water supply. These other types of water dispensers having a cabinet include one type that stores a large bottle (such as three or five gallon) at the bottom of the cabinet. A pump transfers water from the large bottle to the reservoir. At the reservoir, the water is typically refrigerated.

Another type of water dispenser simply connects a water supply (e.g., city water, well water) directly to a reservoir that is hidden inside the cabinet. A float valve or other water level controller can be provided to insure that the reservoir is always filled with water but does not overflow. Water that is transferred from city water, well water or another source can be filtered or otherwise treated before being transmitted to the reservoir.

All of these types of water dispensers that employ cabinets typically have one or more water dispensing spigots on the outside of the cabinet. These spigots are typically manually operated, but can be automatically operated. For example, water vending machines dispense after a consumer pays for water. The water is automatically dispensed when coins are fed to the machine.

One of the problems with cabinet style water dispensers is that of cleansing the reservoir from time to time. Because the reservoir is not air tight, it breathes allowing bacteria to enter the reservoir over a period of time. The reservoirs are typically contained within the confines of the cabinet and are not easily accessed and cleaned by consumers or end users.

For inverted bottle type dispensers, in addition to the problem of an open top, the five gallon bottles are themselves a source of bacteria and germs. Most of these bottles are transported on trucks where the bottles are exposed to outside air. They are handled by operators that typically grab the bottle at the neck, the very part of the bottle that communicates with the open reservoir during use. Unfortunately, it is difficult to convince every person that handles these bottles to wash their hands frequently enough. In order to properly sanitize such a water dispenser or cooler, the user must carefully clean the neck of the bottle prior to combining the bottle with the cabinet. Further, the user should drain and sanitize the reservoir from time to time. The cleansing of the reservoir in such a water dispenser is a time consuming project that is typically not performed at regular intervals.

The dispensing spigots that are provided on common cabinet type water dispensers can also be a source of contamination. These spigots are typically manually operated and are therefore a source of contamination from the users that operate them. Individuals have also been known to drink directly from the spigot. Therefore, sanitation of the spigots as well as the reservoir should be a part of routine maintenance.

Process ozone diffusion by bubble reactor method in small static volumes of water with abbreviated water columns to diffused ozone levels satisfactory to disinfect microorganisms in brief time periods can be difficult to achieve. An ozone generator can be used as the source of ozone. The ozone generator can include an air pump as a source of oxygen for generating ozone. The air pump preferably includes a microbial filter to filter contaminants. A diffuser can be used to diffuse the generated ozone into the water reservoir.

Various factors impact the effectiveness of bacterial removal from the water such as the microbial load, pH, temperature, conductivity, and cooler characteristics (e.g., whether an ice ring has formed which can act as a shield for microbes trapped in the ice ring). Furthermore, the variability of power supply (e.g., European power supplies versus US power supplies) can cause a generator's application to be geographically limited unless modified. Additionally, time constraints for operation of the ozone generator and diffuser can impact operation.

Additionally, in certain refrigerated reservoirs an ice ring can form inside the reservoir adjacent to the cooling coils for the reservoir. Such an ice ring can serve as a form of protection for microbes contained in the ice ring when ozone is being diffused in the reservoir. After an ozone cycle, when the ice melts wholly or partially, the trapped microbes can enter the water and thus contaminate the reservoir.

Additionally, certain waters contain loadings of bromates which can cause problems.

The above indicate a need for developing a generator and diffuser containing flexibility regarding the timing, amount, and duration of ozone generated; along with the timing, amount, and duration of air supplied. Additionally, there is a need for killing microbes which may be trapped in ice rings. Furthermore, there is a need for addressing water containing bromates. Additionally, there is a need for addressing different types of electrical supplies for various geographical areas.

In a preferred embodiment the method and apparatus is directed to an economical means of overcoming each of the factors that limit process ozone's potential disinfecting capacity. It is concerned with the optimization of each point in small automated ozonation systems both upstream and downstream from the ozonator. The object of this effort is to devise a single, economical, high longevity system capable of sanitizing many of the shapes and sizes of water dispensers in use today.

The present invention thus provides an improved self sanitizing water dispenser apparatus as well as a method for generating ozone for cleaning the reservoir and the water contained within it.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

The drawings constitute a part of this specification and include exemplary embodiments to the invention, which may be embodied in various forms.

In a preferred embodiment the generator is programmable regarding the timing, amount, and/or duration of ozone generated and/or air supplied. In a preferred embodiment the generator is programmable regarding microbes which may be trapped in ice rings and/or water containing bromates. Furthermore in a preferred embodiment the generator can automatically adjust for different types of electrical supplies for various geographical areas.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 7 is a perspective view of a pump for an ozone generator;

FIG. 8 is a perspective view of the pump in FIG. 7 with the input filter removed;

FIG. 9 is another perspective view of the controller of FIG. 3 with the casing opened;

FIG. 10 is a close up view of an ozone generation component in the controller of FIG. 3;

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
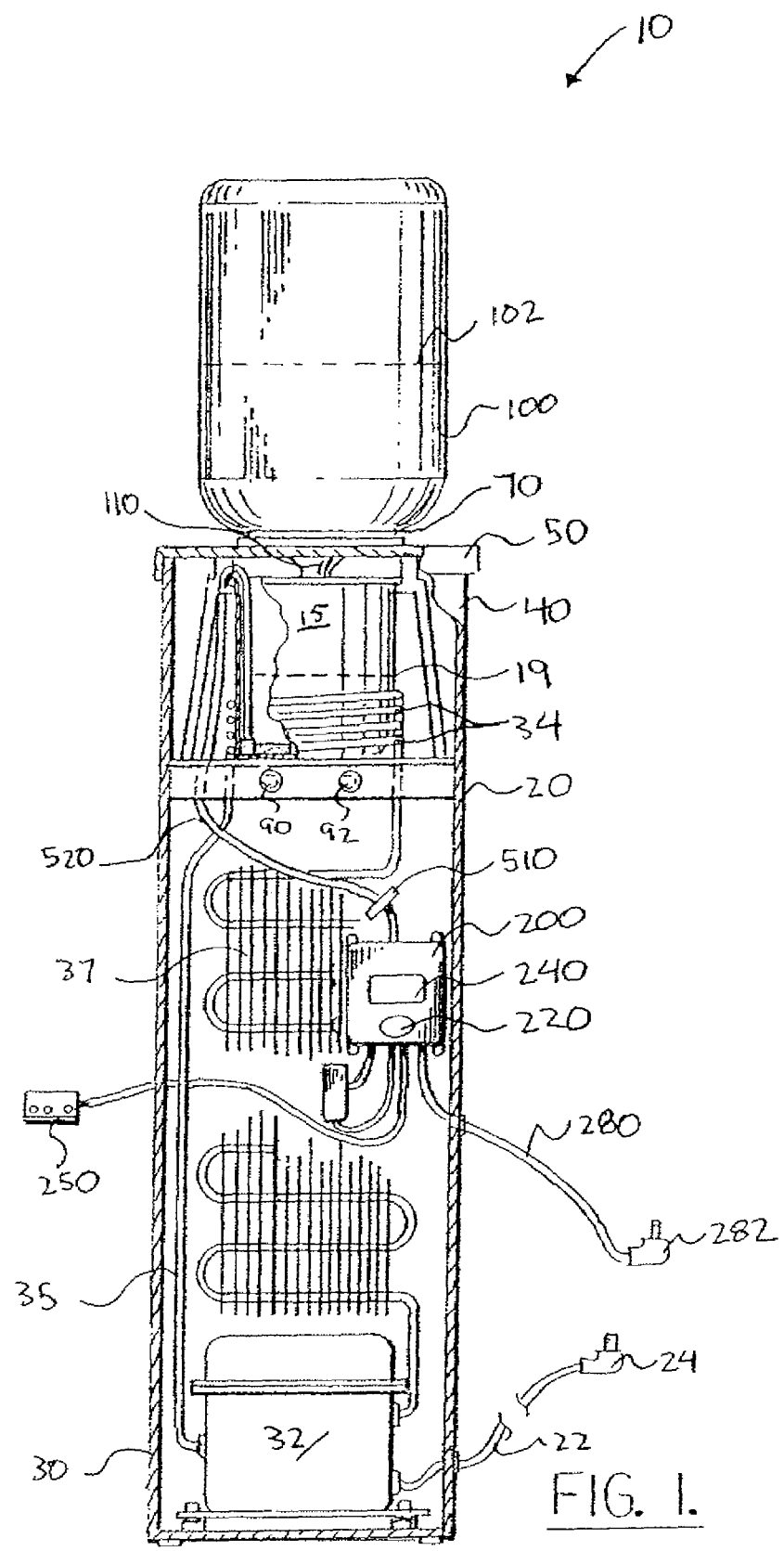
FIG. 1 is diagram of a water cooler incorporating one embodiment of a programmable controller.

FIG. 1 is diagram of a water cooler 10 incorporating one embodiment of a programmable controller 200. Water dispenser 10 provides an improved apparatus that sanitizes the open reservoir from time to time with ozone. The apparatus 10 includes a cabinet 20 having a lower end portion 30 and an upper end portion 40. The upper end portion 40 carries a cover 50 having an opening 60.

Opening 60 provides an annular flange 70 and a gasket 80 that define an interface between cabinet 20 and bottle 100. Bottle 100 can be any commercially available bottle, typically of a several gallon volume (e.g. five gallons). Bottle 100 can provide a constricted bottled neck 110 that is placed inside an open reservoir 15 during use. Bottle neck 110 has an opening for communicating with a reservoir 15 at the interior of cabinet 20 that holds the water product to be dispensed and consumed. When the water level 19 in reservoir 15 is lowered during use, air bubbles enter bottle 100 and water replenishes reservoir 15 until pressure equalizes.

Reservoir 15 has an interior 16 surrounded by reservoir sidewall 17 and reservoir bottom wall 18. Reservoir 15 can be, for example, generally cylindrically shaped and of a stainless steel or plastic material. Reservoir 15 can provide an open top for communicating with neck 110 of bottle 100.

During use, reservoir 15 has water level 19 that fluctuates slightly as water is dispensed and then replenished by bottle 100. One or more spigots 90,92 can be provided for withdrawing water contained in reservoir 15. For example, a left hand spigot 90 can have a flow line that extends up to and near water level 19, thus removing ambient temperature water from reservoir 15 that is not in close proximity to the cooling coils 34 of cooling system which includes a compressor 32. Spigot 92 can provides a port for communicating with water contained in reservoir 15. Because the refrigeration coils 34 are positioned at the lower end of reservoir 15, spigot 92 withdraws cool water. As a practical matter, a water dispenser apparatus 10 could provide either ambient temperature water, cold water or heated water if, for example, a flow line 96 were to be provided with a heating element.

For cooling the water at the lower end portion of the reservoir 15, a cooling system that includes a compressor 32 can be provided. The refrigeration system includes flow lines 35, 36 in combination with compressor 32 to transmit cooling fluid to coils 34 and then to heat exchanger 37 as part of a system for cooling water in reservoir 15. Power can be provided by electrical lines, including an electrical line 22 provided with plug 24.

Water in reservoir 15 can be disinfected by ozone supplied by controller 200 operably connected to ozone generator 600.

Figure 2:
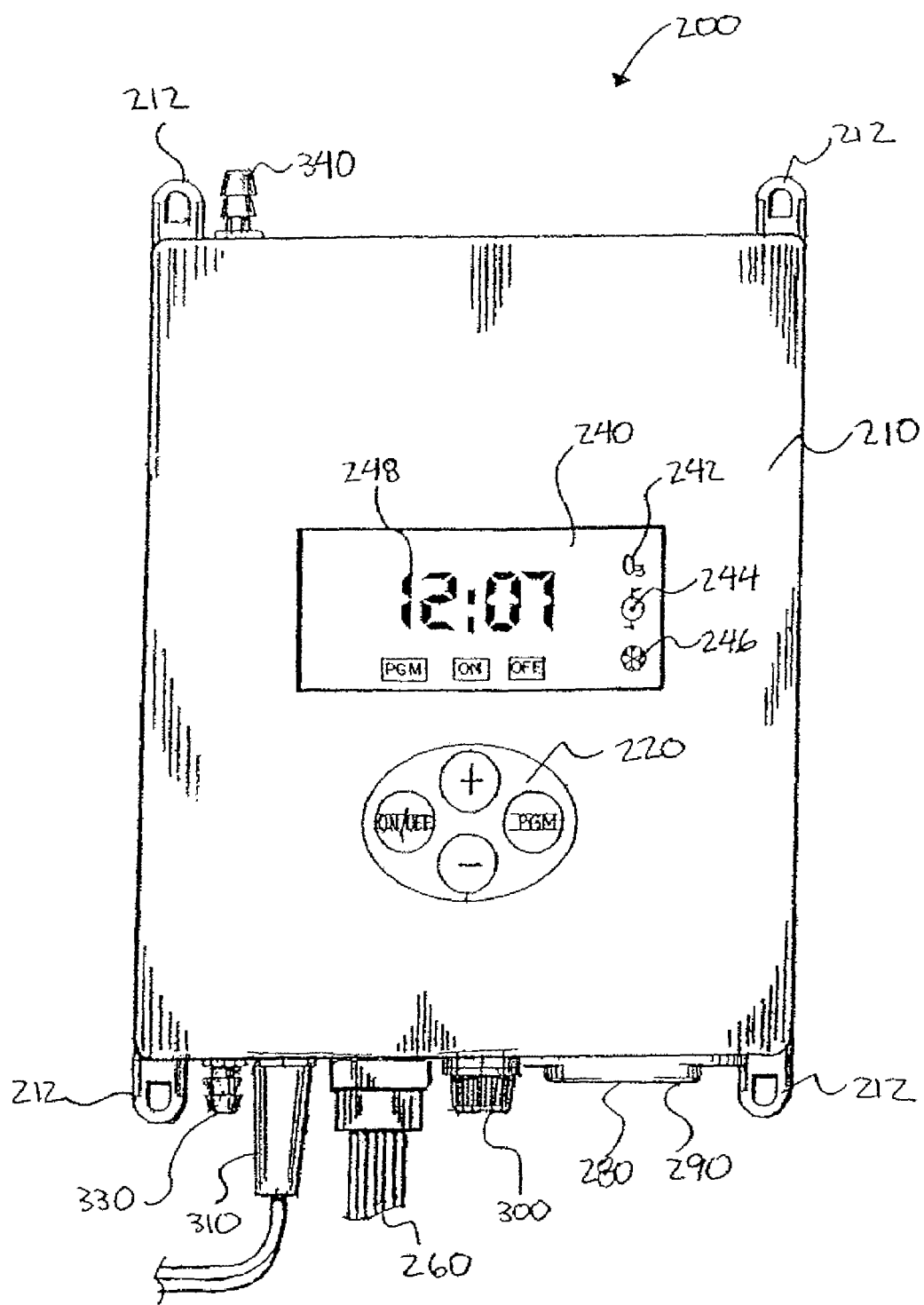
FIG. 2 is diagram of a programmable controller.
Figure 3:
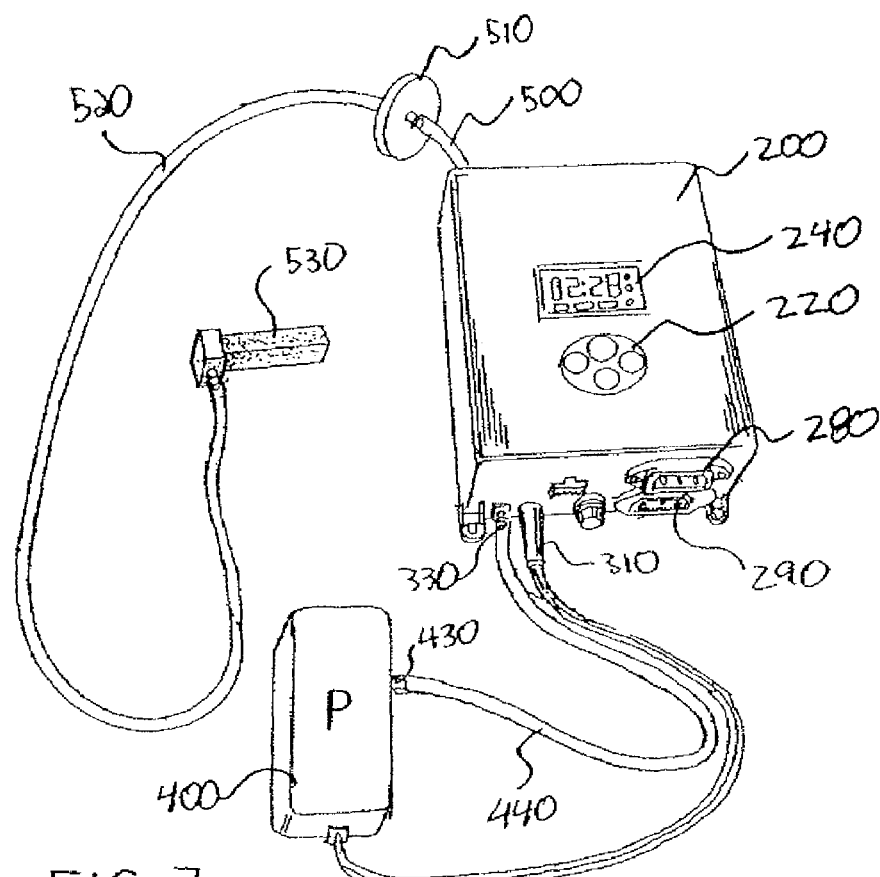
FIG. 3 is a perspective view of a programmable controller.
Figure 4:
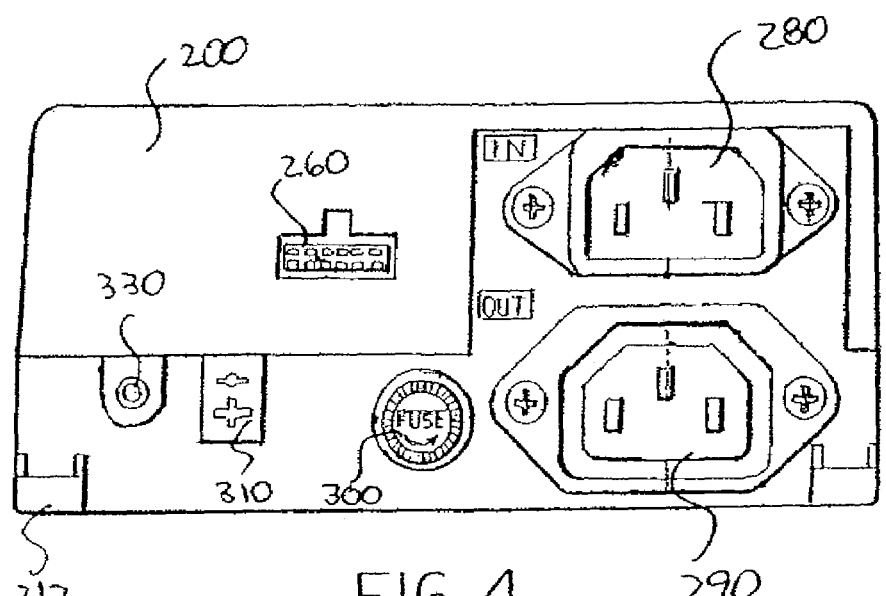
FIG. 4 is an end view of the controller of FIG. 3.
Figure 5:
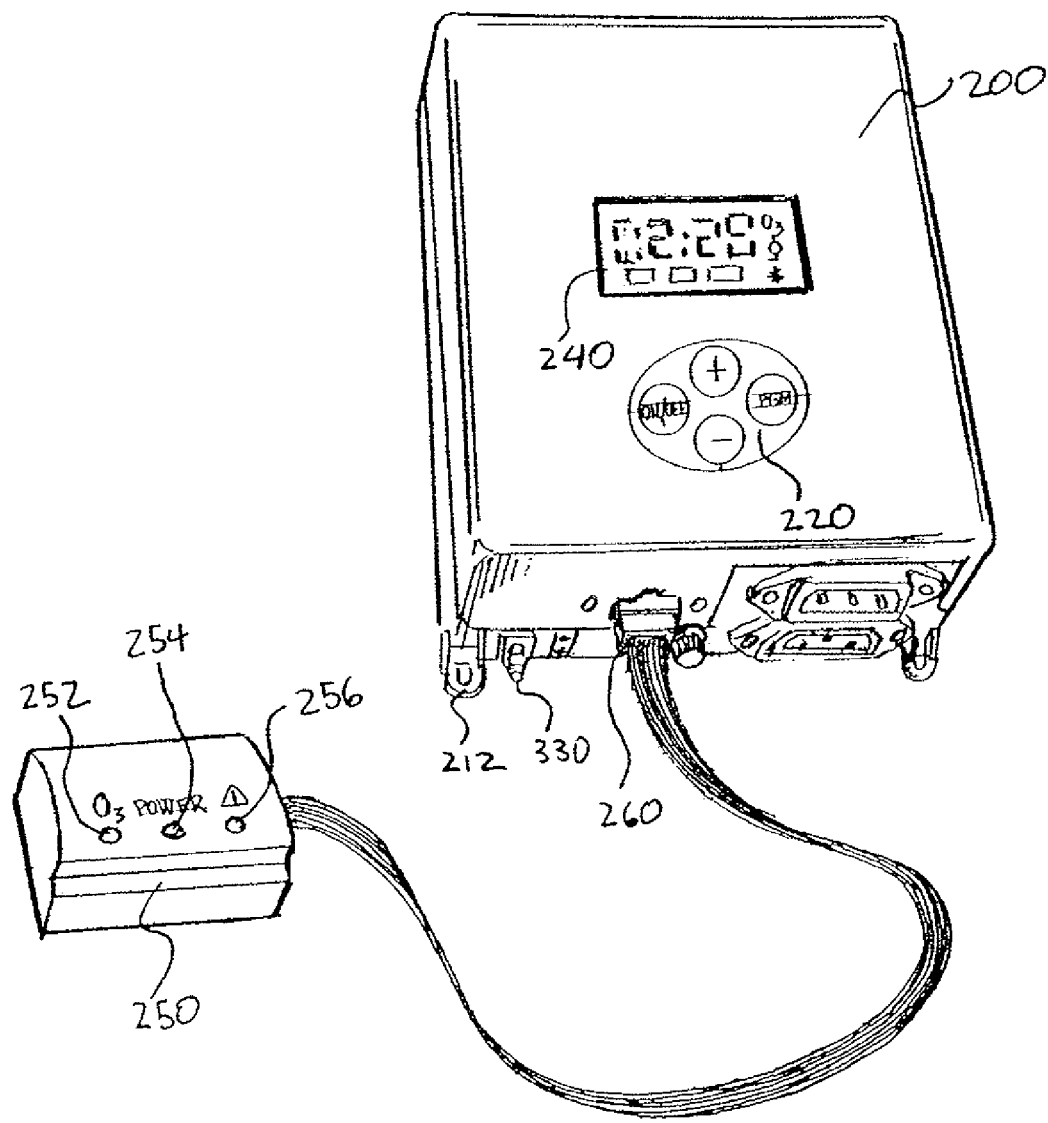
FIG. 5 is a top view of the controller of FIG. 3 with a remote display.
Figure 6:
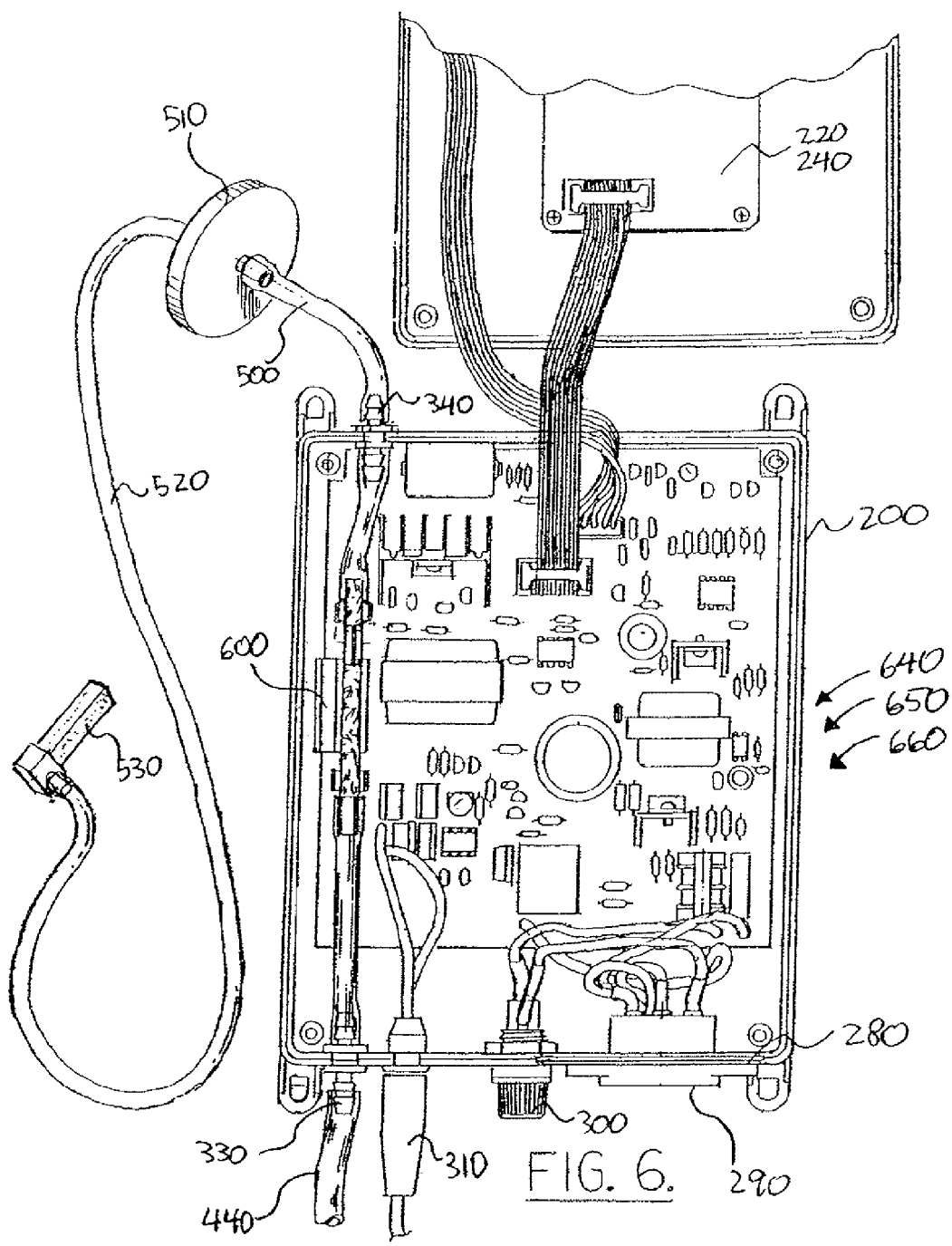
FIG. 6 is a perspective view of the controller of FIG. 3 with the casing opened.

FIG. 2 is diagram of a programmable ozone generator controller 200. FIG. 3 is a perspective view of programmable controller 200. FIG. 4 is an end view of controller 200. FIG. 5 is a top view of controller 200 with a remote display 250. FIG. 6 is a perspective view of controller 200 with casing 210 opened. FIG. 7 is a perspective view of a pump 400 for ozone generator 600. FIG. 8 is a perspective view of pump 400 with input filter 420 removed. FIG. 9 is another perspective view of controller 200 with casing 210 opened. FIG. 10 is a close up view of ozone generation component 600 which can be located in controller 200.

Generally, programmable controller 200 can comprise casing 210, display 240, programmable input 220, ozone generator 600, pump 600, and power input 280. Controller 200 can incorporated a digital computer. In one embodiment ozone generated from generator 600 can controlled by controller 200 can be injected into reservoir 15 through a diffuser 530. Alternatively, programmable controller can include clock 280. To assist in programming ozonation, air, and compressor cycles, controller display 240 can include ozone indicator 242, gas or air flow indicator 244, and power or compressor indicator 246.

In one embodiment, a low permeability filter 510 is placed between ozone generator 600 and diffuser 530. Filter 510 is preferably of a permeability which will allow gas to flow through but resist flow of liquid (e.g., liquid water) up to a head of 10 feet of water. Alternatively, between 3 to 10 feet of water. Filter 510 can prevent liquid from forming inside of ozone generator 600 and causing a failure of generator 600. Check valves were preferred in prior embodiments, however, check valves had a tendency to stick or remain in an open position allowing liquid to pass through and accumulate in ozone generator 600. Filter 510 is preferably made from an expanded PTFE manufactured by W.L. Gore material having an average pore size of one micron. More preferably, the permeability includes a range of average pore sizes between about 0.2 microns to about 3 microns. Most preferably, the permeability includes a range of average pore sizes between about 0.5 microns to about 1.5 microns. Other materials can work where they have permeabilities preventing the formation of liquid in ozone generator 600. That is the materials generally restrict liquid flow, but allow gaseous flow. Moisture in gas (e.g., humidity) flowing through ozone generator 600 will not cause failure of ozone generator 600.

In a preferred embodiment programmable controller 200 can control the timing and/or duration and/or amount of ozone generated. In a preferred embodiment the amount of ozone generated can be set at levels of 25%, 50%, 75%, and 100%. It is anticipated that for higher microbial loads higher percentages of ozone generation will be set. Additionally, it is anticipated that the level of ozone generated during any one time period can also be changes—for example, from higher to lower or from lower to higher or sinusoidal. In one embodiment the time ozone is generated can be programmed to occur only on certain days of the week or at certain time periods (e.g., on Wednesday and Fridays at 1300 hours) during any calendar period.

In a preferred embodiment programmable controller 200 can control the timing and/or duration and/or amount of gas (e.g., ambient air) pumped through controller 200 (e.g., for ozone generator 600 or merely for air flow to diffuser 530). For example air can be pumped through diffuser 530 before any ozone is generated. Such activity can help to remove potentially deleterious items in the water, such as bromates. Additionally, compressor 32 on the water dispenser 10 can be cut off by the controller 200 while air is being pumped. Such an event would assist in melting an ice ring in reservoir 15 (e.g., being roughly analogous to a defrost cycle in a freezer). After the ice ring was melted, controller 200 could then send ozone though diffuser 530 killing a substantial portion of the microbes in the water. Following ozone being sent through diffuser 530 programmable controller 200 could then send air through diffuser 530 removing ozone which was previously diffused through diffuser 530. Each of these events could be controlled by the programmable controller 200 and individually programmed by a user.

In a preferred embodiment programmable controller 200 can also control power to compressor 32. Some water coolers 10 make ice inside their reservoirs 15 to make sure that customers get a very cold drink of water. Before ozonation takes place, controller 200 can shut off compressor 32 to insure that all of the ice melts either before or during the ozonation cycle. Even though frozen water can be unfriendly to bacteriological growth, this option addresses the risk that an ice ring would shield certain microbes from the ozonation process. For example, compressor 32 can be shut off one or two hours before the ozonation process begins. Alternatively, compressor 32 can be shut off only during the ozonation process. Alternatively, compressor 32 is not shut off.

In an alternative embodiment programmable controller 200 can automatically adjust for different types of electrical supplies (e.g., input voltages) for various geographical areas. For example, different voltages are used in the United States and Europe. Controller 200 can include a voltage control circuit 620 which senses the supply voltage and adjusts same to power controller 200 and the items operably connected to controller 200, such as ozone generator 600, pump 400, and compressor 32.

In an alternative embodiment programmable controller 200 can be programmable on a calender. For example, programmable controller 200 can be programmed on a 999 hour repeatable calender. That is, a user can program ozonation, air pumping, and/or compressor operation individually and separately for specific start and ending periods during the 999 hour repeat cycle. Alternatively, programmable controller 200 can use a 24 hour repeat cycle and a user can program ozonation, air pumping, and/or compressor operation individually and separately for specific start and ending periods during the 24 hour cycle. Alternatively, programming ozone generation can automatically require that air be pumped during the time of ozonation regardless of whether air pumping was individually programmed to overlap with the ozonation cycle. Alternatively, more than one cycle can be programmed for ozonation, air, refrigeration in any one programming period.

In an alternative embodiment pump 400 can be separated from programmable controller 200. Pump 400 can be fluidly connected to inlet 330 of controller 200 through tube 440. Air pumped from outlet 430 will tend to be at an elevated temperature from ambient air because of the pumping action of pump 400. Ozone generator 600 will tend to generate less ozone when the incoming air is at higher temperatures. Preferably, tube 440 is long enough to allow the air to cool down before entering ozone generator 600. It has been found that seventeen or eighteen inches (43 or 46 centimeters) for tube 440 allows the air to cool sufficiently before entering ozone generator 600. Preferably, pump 400 can pump about 2 liters per minute of air.

In one embodiment, programmable controller 200 can issue a warning signal where pump 400 has not been programmed to operate at least during the entire time that ozone generator 600 has been programmed to operate. This can increase the life of ozone generator 600, as ozone generator 600 may overheat where it is operated without air flow.

FIG. 4 is an end view of controller 200. Casing 200 can include power output 290 and power input 280. Standard receptacles for output 290 and input 280 are shown. To accommodate individual receptacle types (e.g., United States versus European) different lines can be used having the appropriate plugs or receptacles. Also shown is fuse 300 which can be a standard fuse and is designed to address excessively high current or high voltage situations. Power for pump receptacle 310 is shown as being specially formatted to restrict the ability to use a pump 400 that is not properly configured with controller 200. Output 260 is shown for remote display 250.

FIG. 5 is a top view of ozone generator controller 200 with a remote display 250. Remote display 250 can include an ozone indicator 252, power indicator 254, and error indicator 256. Remote display 250 preferably can be placed at a position where a user of water dispenser 10 can readily view the display 250. In many situations this will be spaced apart from controller 200. For example, remote display can be positioned on the front or side of water dispenser 10 where controller 200 is positioned at the rear or inside of water dispenser 10. Ozone indicator 252 will preferably light up when ozone is being generated by ozone generator 600. This can serve as a warning signal for a user to not dispense water while ozone indicator is lighted. Alternatively, ozone indicator 252 can light up not only when ozone is being generated, but for a set period of time after ozone has been generated, such as 5, 10, 15, 20, 25, or 30 minutes, or longer, which will allow time for ozone to be removed from water dispenser 10. Ozone indicator 252 can be a red light to indicate a warning or to stop. Power indicator 254 can be lighted when power is being received by controller 200. Power indicator 254 can be green to indicate a good power situation. Error indicator 256 can be lighted when a failure or error situation has occurred with controller 200. Error indicator 256 can be a yellow light to indicate caution. For example, where there has been a power interruption or where the ozone generator did not come on during a cycle, error indicator 256 can be lighted.

Alternatively, ozone indicator 252 can remain lighted where a successful ozonation cycle has occurred within a set period of time, such as within the last 24 hour period. In this case ozone indicator 252 can be a green light.

In an alternative embodiment a test button can be provided to test the ozonation cycle. Where test button is activated, the ozonation cycle will be run for a set period of time, for example, thirty seconds. Alternatively, during the test ozone indicator 252 can be lighted where the ozonation cycle is being operated.

In an alternative embodiment a remote programming input unit 230 for programmable controller 200 can be provided. A remote programming input 230 could allow controller 200 to be located in the rear of water dispenser 10 while programming input 230 located on the front or one of the sides of dispenser 10.

FIG. 6 is a perspective view of controller 200 with casing 210 opened. FIG. 9 is another perspective view of ozone generator controller 200 with casing 210 opened. FIG. 10 is a close up view of ozone generation component 600 in ozone generator controller 200. Controller 200 can include a digital computer which includes control circuit 640 for ozone generation, control circuit 650 for air generation, and control circuit 650 for compressor 32 power. Controller 200 can also include control circuit 620 for voltage converter. The individual circuits are shown in the diagrams attached to this disclosure.

FIG. 7 is a perspective view of a pump 400 for ozone generator controller 200. FIG. 8 is a perspective view of pump 400 with input filter 420 removed. Pump 400 can include input 410, filter 420, filter cap 422, and output 430. Pump 400 can be spaced apart from or included in casing 210 for controller 200.

Figure 11A:
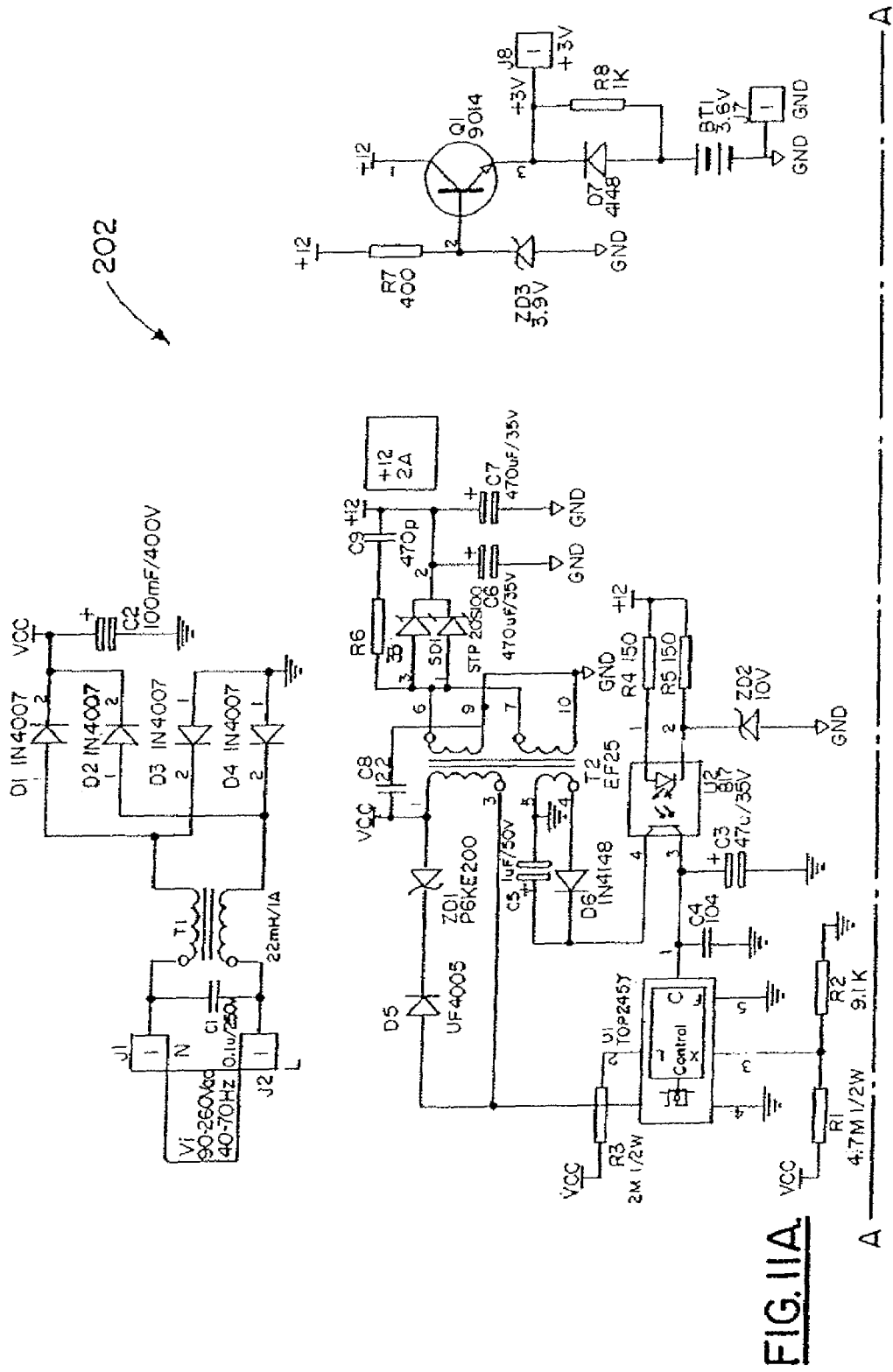
FIG. 11A-11C are a circuit diagram for one embodiment of programmable controller.
Figure 11B:
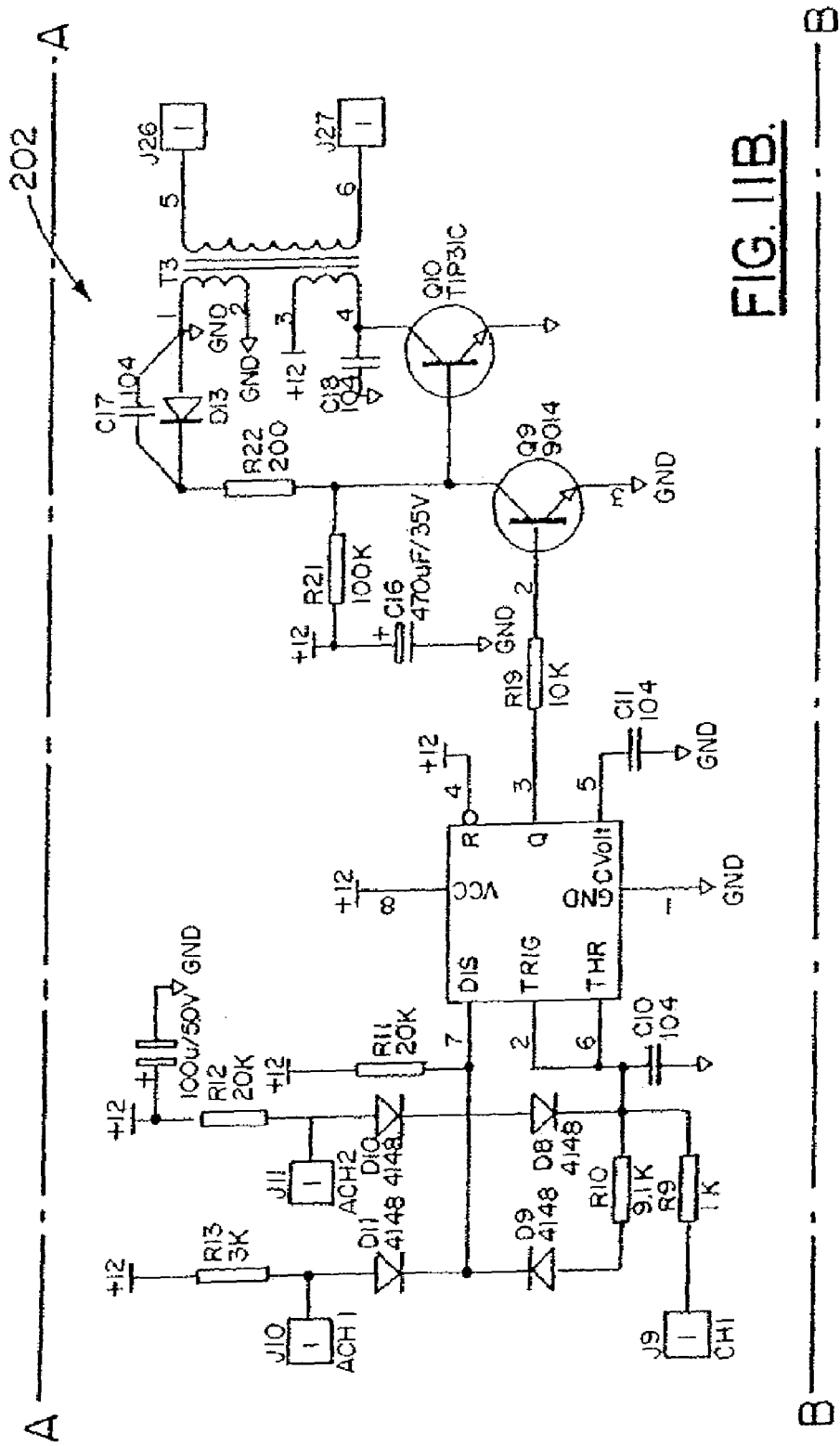
Figure 11C:
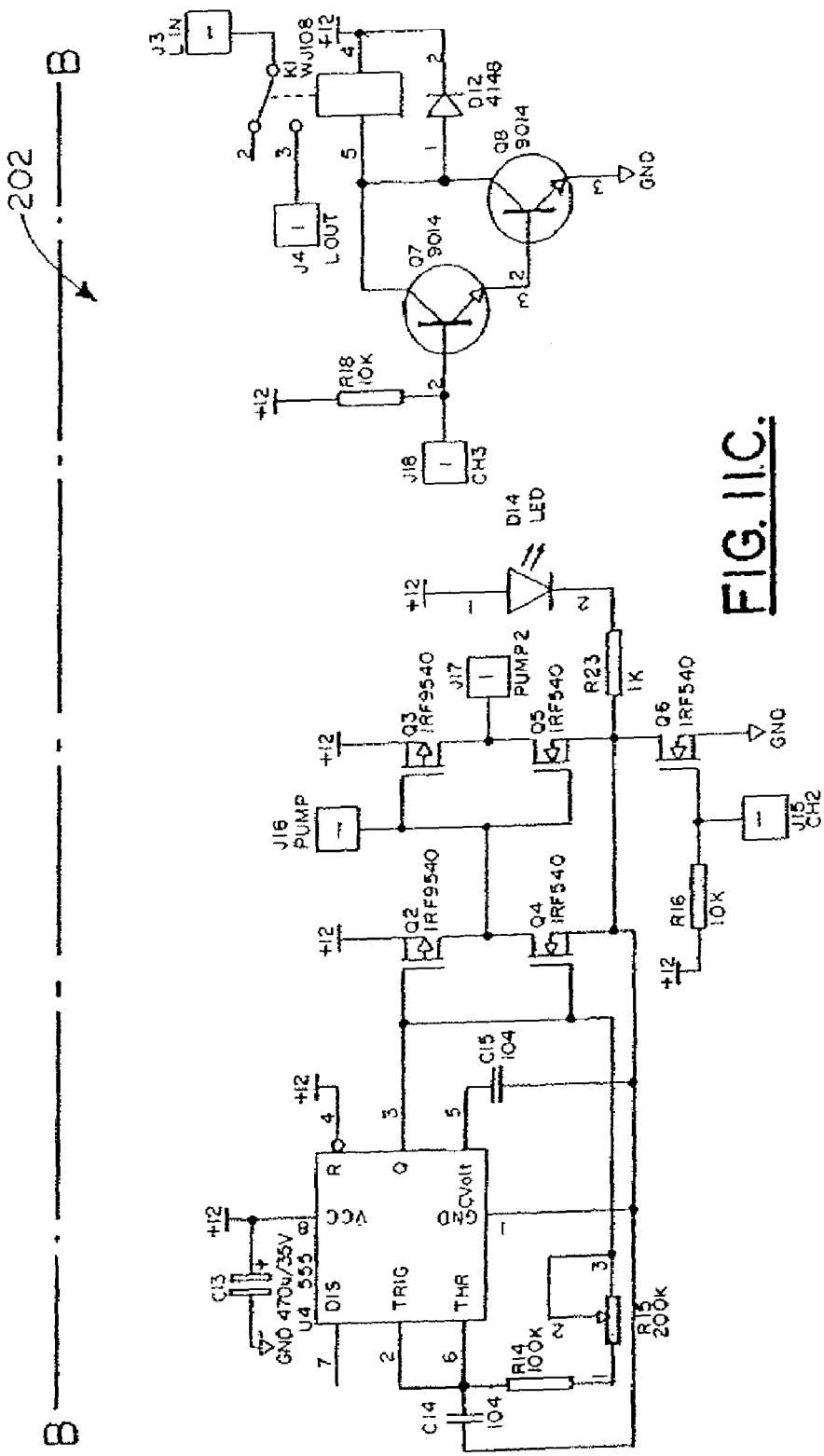
Figure 12A:
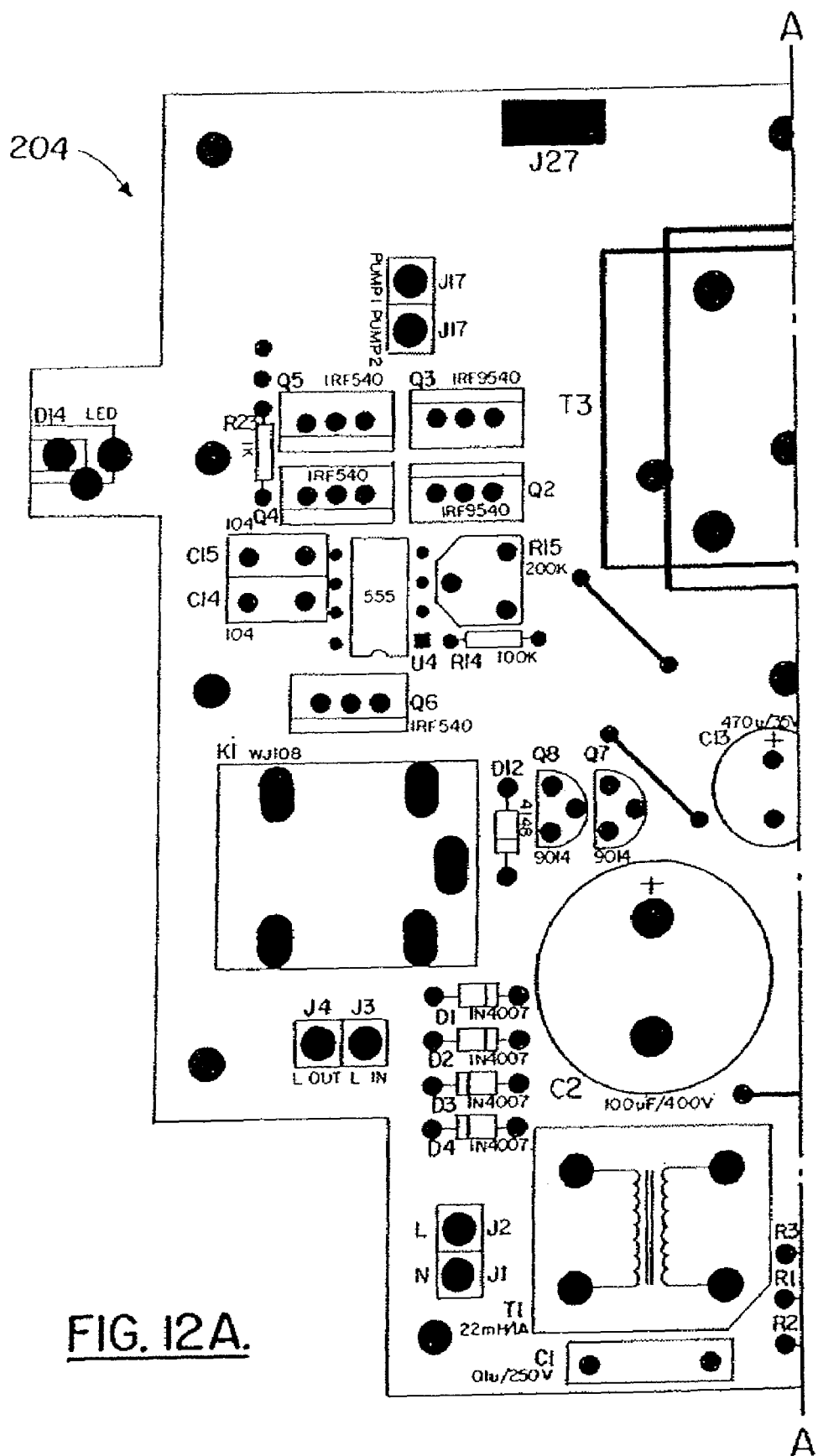
FIG. 12A, 12B are a diagram of a circuit board for the programmable controller of FIG. 11.
Figure 12B:
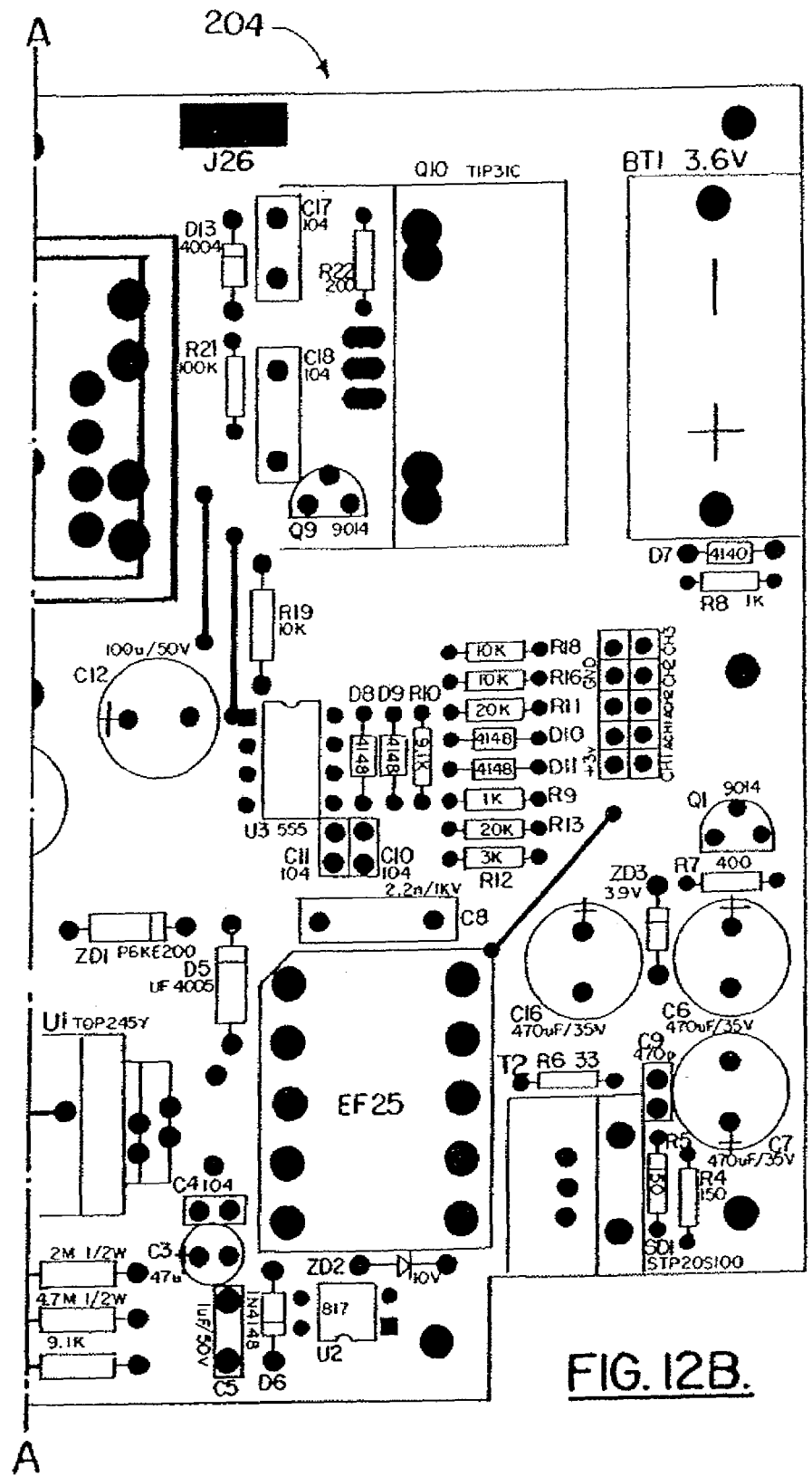
Figure 13:
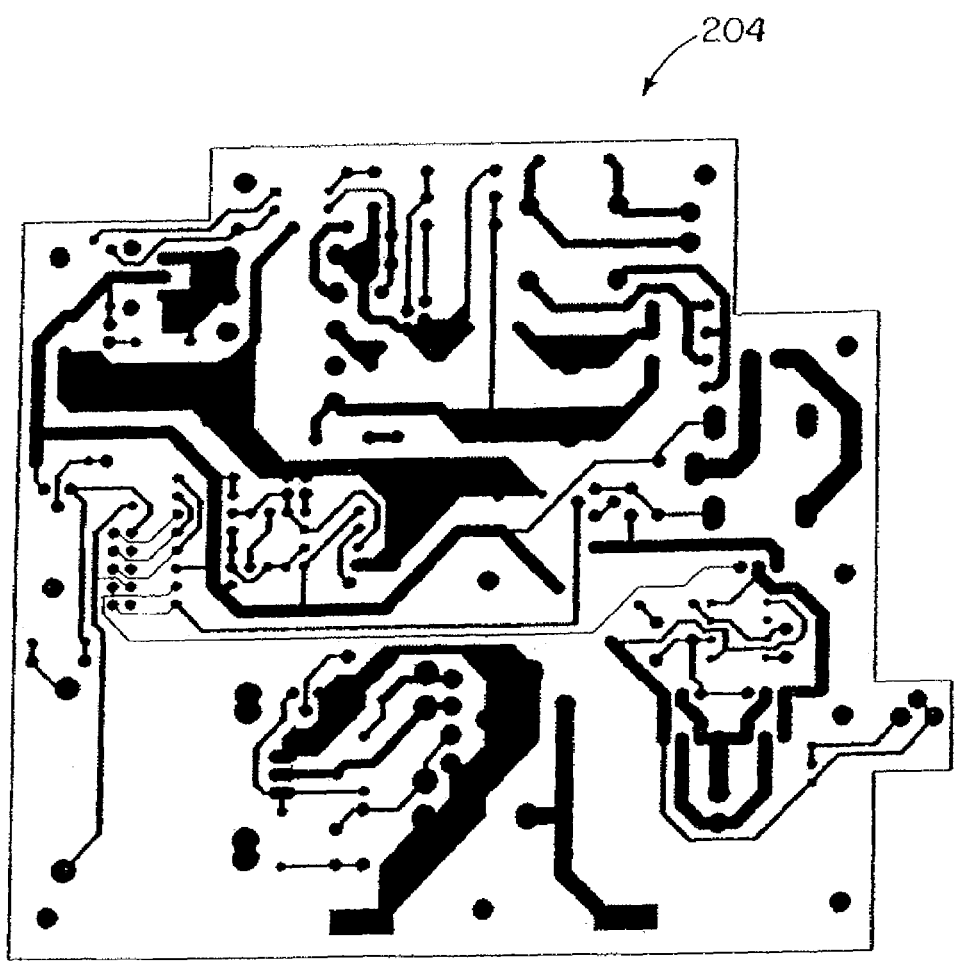
FIG. 13 is a diagram of the rear of the circuit board in FIG. 11.

FIG. 11 is a circuit diagram 202 for one embodiment of programmable controller 200. FIG. 12 is a diagram of a circuit board 204 and various components for programmable controller 200. FIG. 13 is a diagram of the rear of the circuit board 204.

Figure 14A:
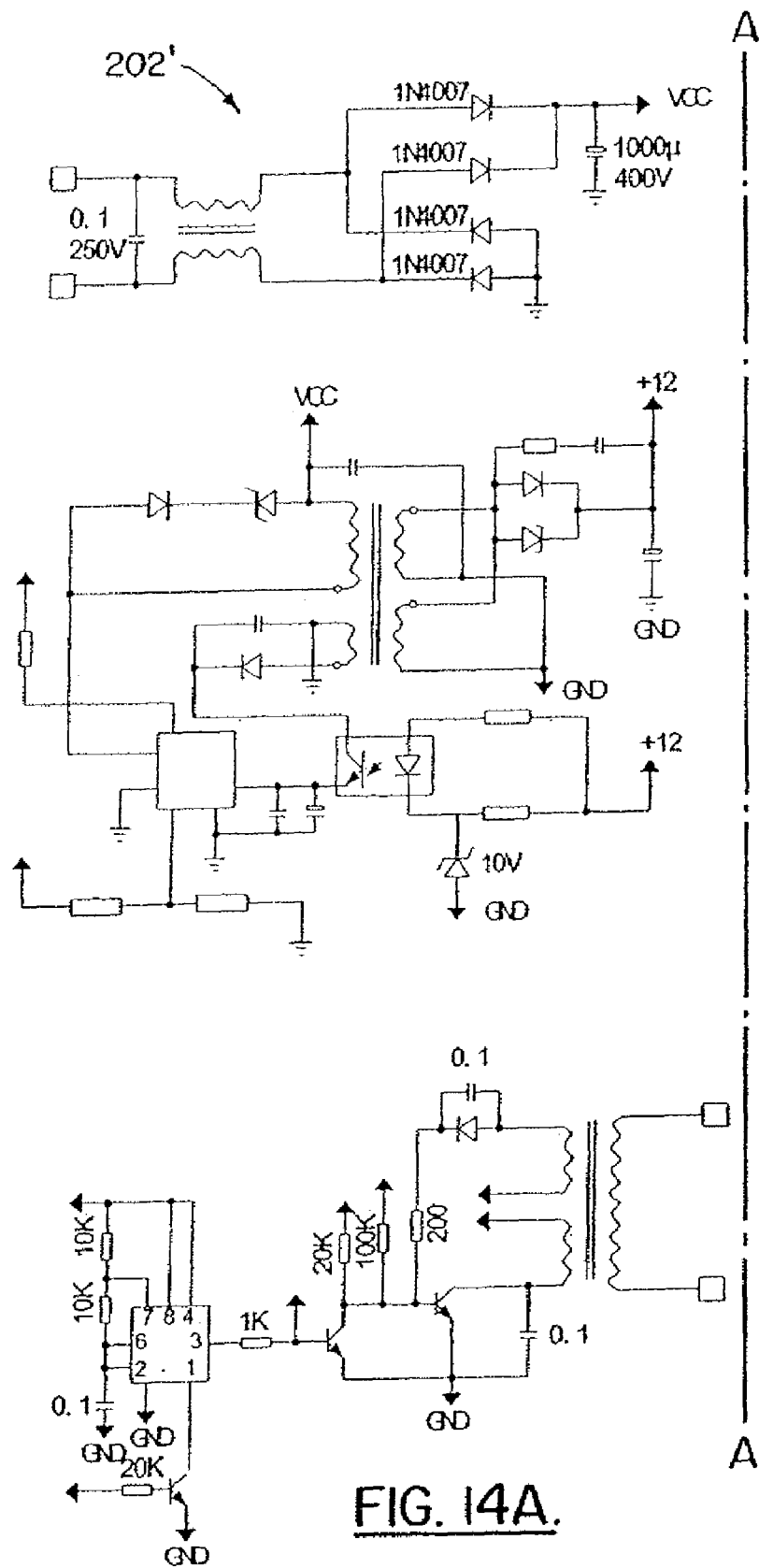
FIG. 14A, 14B are a circuit diagram for an alternative embodiment of programmable controller.
Figure 14B:
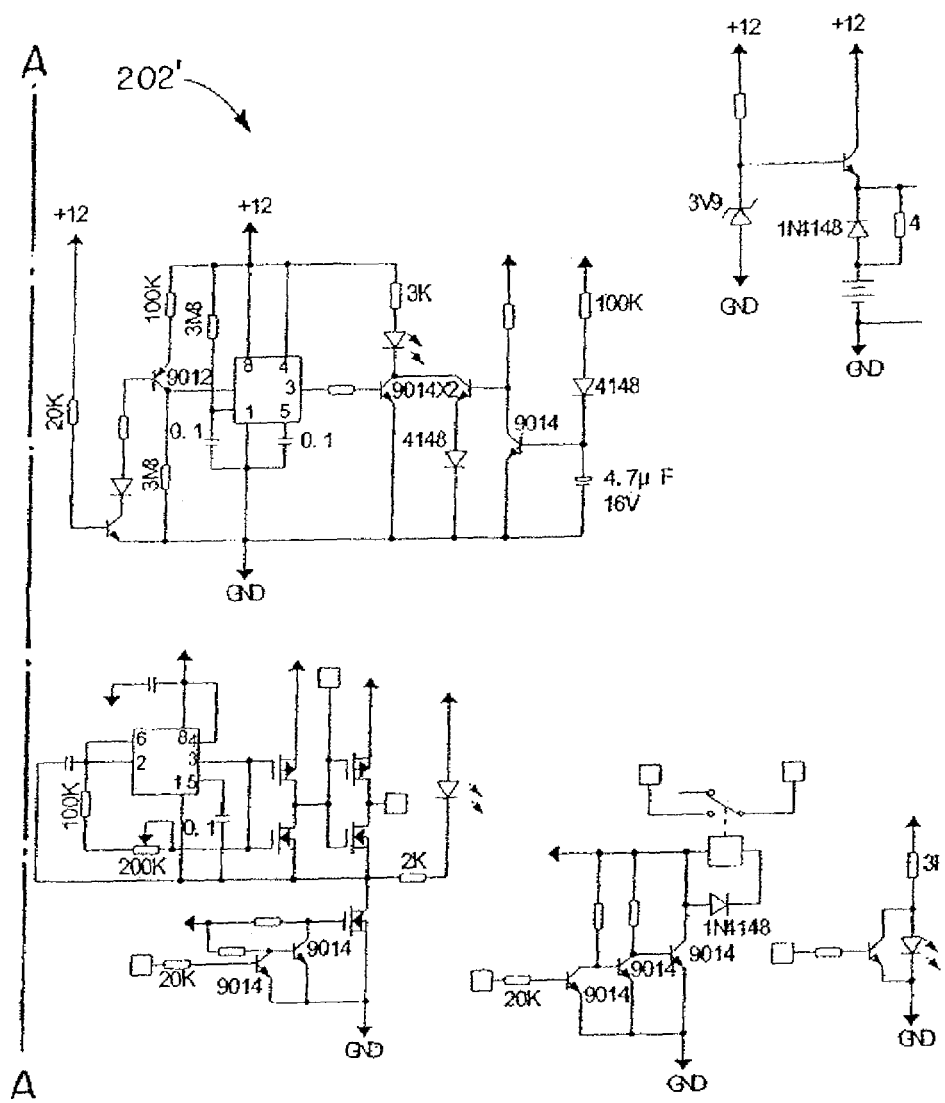
Figure 15:
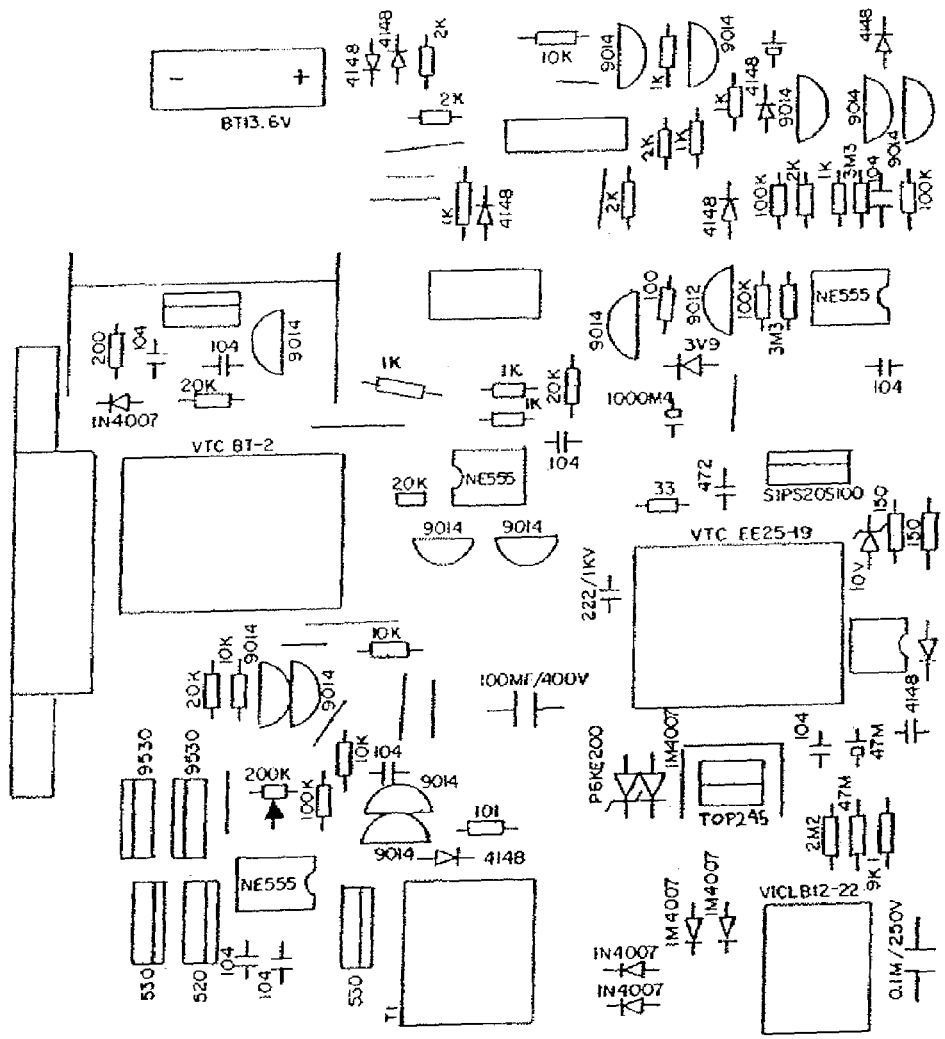
FIG. 15 is a diagram of a circuit board for the programmable controller of FIG. 14.
Figure 16:
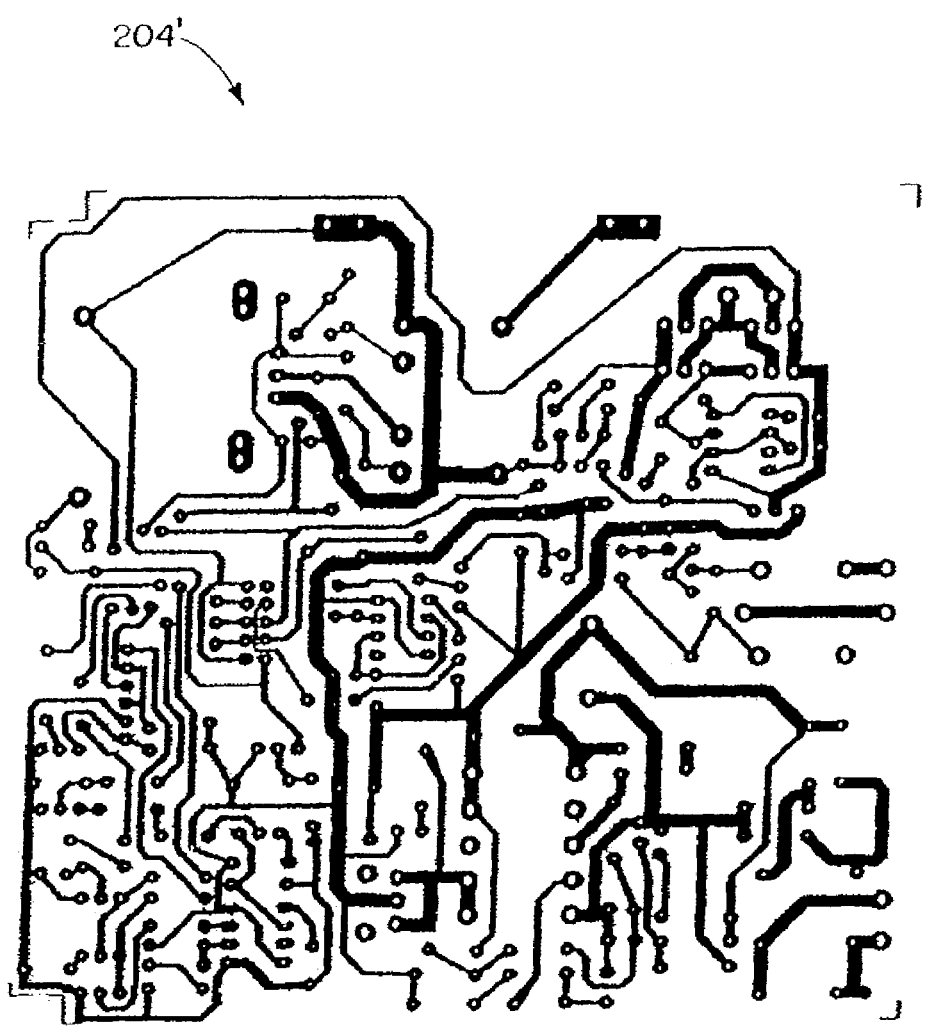
FIG. 16 is a diagram of the rear of the circuit board in FIG. 15.

FIG. 14 is a circuit diagram 202' for an alternative embodiment of programmable controller 200'. FIG. 15 is a diagram of a circuit board 204' and various components for programmable controller 200'. FIG. 16 is a diagram of the rear of circuit board 204'.

Table 1 lists possible items which can be used in programmable controller 200. SIP 1000 is an operation and programming manual for programmable controller 200. Each of these items is part of the disclosure of this application and all are incorporated herein by reference.

Table 2 lists possible items which can be used in an alternative programmable controller 200. SIP 2000 is an operation and programming manual for alternative programmable controller 200. Each of these items is part of the disclosure of this application and all are incorporated herein by reference.

SIP 1000 Operation and Programming Manual

Figure 17A:
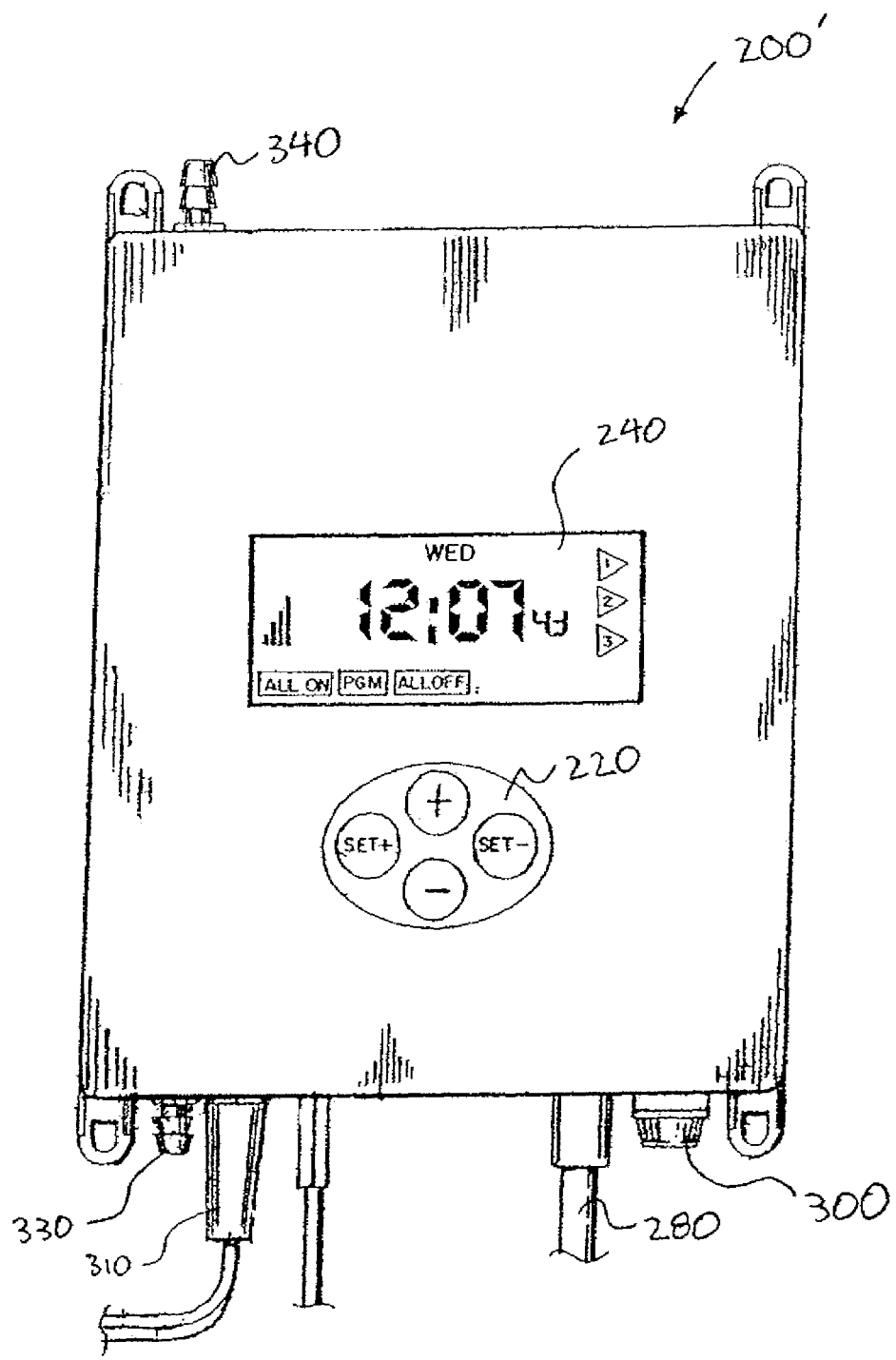
FIGS. 17-34G are figures from operating manuals of programmable controller.

Below (FIG. 17A), please find an illustration that will show you the major functions and components of the SIP 1000.

Before the "Programming" is explained, on the next page you will find a more detailed explanation of the options on the display.

The Display

Except during programming, the SIP 1000 display shows you the current time (after it has been set properly). This is know at the "Clock State". During programming, it will show you exactly which function you are changing in the program by flashing that number. If you do not enter a number within 30 seconds (during programming), the module will revert to the Clock State.

Figure 17B:
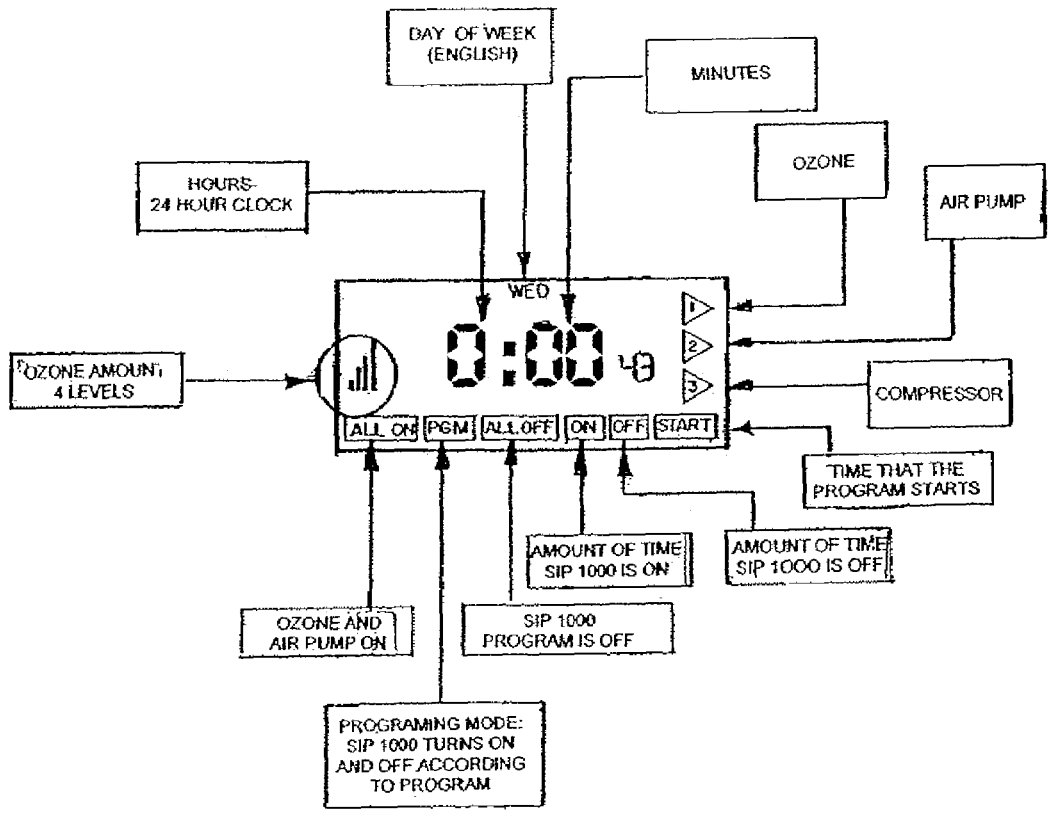

Below (FIG. 17B), please find an illustration of the display with an explanation of the various components.

Please note that many the above are visible only when you are using or programming that function. For example, the "PGM" on the display only shows when you are actually in Program Mode.

Figure 17C:
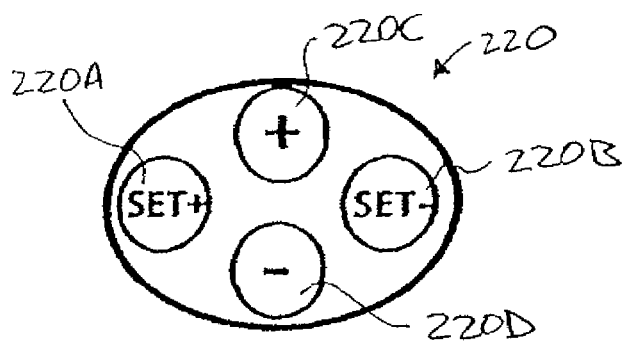

Function Button Overview:

You will also notice that there are found buttons on the front panel. The Four Programming Buttons are shown in FIG. 17C.

Here's a brief explanation of what the buttons do. This manual will take you step by step through the programming sequence—so it's important to get a general sense of what these buttons do now.

The "SET+" button 220A enters the number and moves you forward through FUNCTIONS The "SET−" 220B button moves you backwards through FUNCTIONS The "+" button 220C moves you forward through NUMBERS when you are in Programming mode. In the Clock State, it also will turn the module on, turn the module off and/or put the module in Program Mode.

The "−" button 220D moves you backwards through NUMBERS when in Programming mode. In the Clock State, it also will allow you to adjust the ozone output (25%, 50%, 75% or 100%)

All clock and timer functions are performed with these keys. If you make an incorrect entry during programming you can always go back and enter a correct number by hitting the "SET−" button.

CLOCK STATE KEY FUNCTIONS: The "+" and the "−" buttons 220C,220D do something other than change the number when the SIP 1000 is in it's Clock state (not during programming).

The "+" Button

Figure 18:
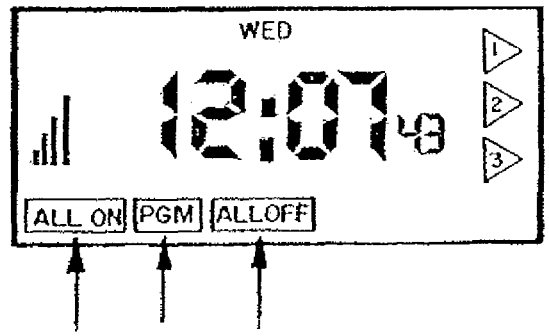

The "+" button 220C controls the operation of the SIP module. Pressing the "+" button 220C—when not programming—will turn on the ALL ON, the PGM or the ALL OFF (FIG. 18) (explained below). Only one of these three options will be on at a time.

When the module is in ALL ON, you are overriding the program and turning the module on. If installed properly, the module will immediately begin producing ozone.

When you are in ALL OFF mode, the module is NOT running the program that was entered. The SIP 1000 is "off" and only displays the time.

When you are in PGM mode, the SIP 1000 is operating according to the setting that were last entered during the Programming (the time the module comes on, how long it is activated, etc.).

Figure 19:
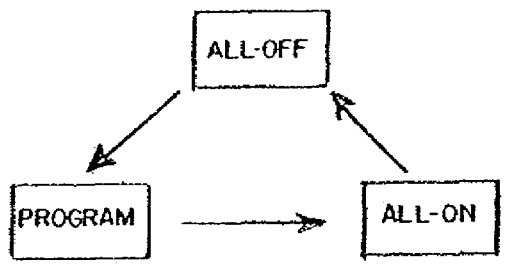

Each press of "+" button 220C switches from ALL ON to PROGRAM to ALL OFF—and then back to ALL ON. (FIG. 19). Again, this is when the module is not in programming mode.

The "−" Button

Each press of the "−" button 220D adjusts the ozone output. There are 4 bars that represent the ozone output setting.

Figure 20A:
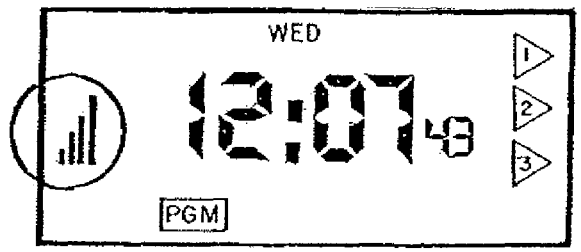

The SIP 1000 on the highest setting (FIG. 20A).

Each bar represents 25%—so all four visible indicates 100%—the highest setting. Three visible is 75%. Two visible is 50% and so on.

Figure 20B:
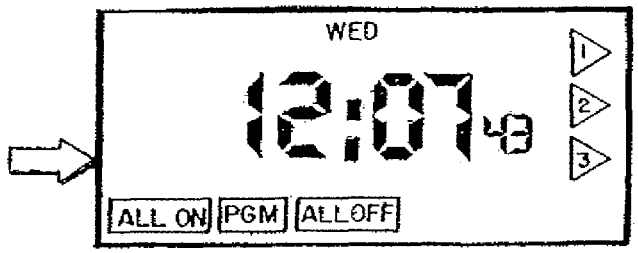

SIP 1000 Displaying Lowest Ozone Output Setting (25%) (FIG. 20B).

Figure 20C:
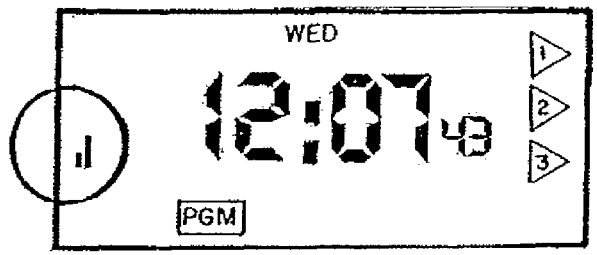

SIP 1000 Displaying The Medium Setting (50%) (FIG. 20C)

Figure 20D:
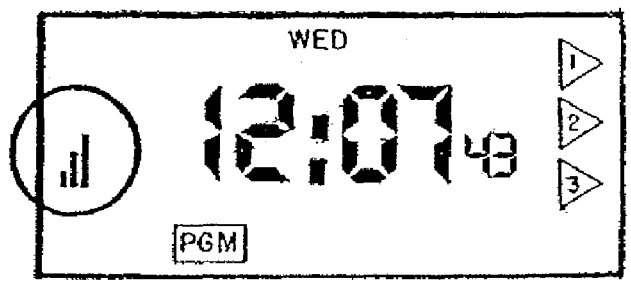

SIP 1000 Displaying The Medium-High Setting (75%) (FIG. 20D)

Programming

Programming the SIP 1000 is easy once you get used to it.

A few important things to remember when programming:

When you are programming, the number you are changing will be flashing.

The "+" and the "−" buttons will move you to higher or lower numbers

The "SET+" button ENTERS the number AND moves you to the next function (see QUICK PROGRAMMING SEQUENCE OVERVIEW below).

During programming, if you fail to push a button within 30 seconds, the module will stop programming mode. However, the SIP 1000 remembers the numbers that you did program in. So, to get back to the part of the programming sequence where you left off, you only have to continually push the "SET+" button.

Here is a short overview of the programming functions. More detail is provided on the following pages.

Quick Programming Sequence Overview

| STEP | BUTTON | ACTION | DETAIL |
|---|---|---|---|
|  | SET+ | CLOCK | Day of week |
|  | SET+ | " | Hours |
|  | SET+ | " | Minutes |
|  | SET+ | " | Seconds |
| 1A | SET+ | OZONE TIME | Hours - - How Long SIP Ozonates |
| 1B | SET+ | " | Minutes - - How Long SIP Ozonates |
| 1C | SET+ | " | Hours - - How Long SIP Ozonates OFF |
| 1D | SET+ | " | Minutes - - How Long SIP Ozonates OFF |
| 1E | SET+ | " | Hours - - What Time Ozonation Starts |
| 1F | SET+ | " | Minutes - - What Time Ozonation Starts |
| 2A | SET+ | AIR PUMP TIME | Hours - - How Long Air Pump On |
| 2B | SET+ | " | Minutes - - How Long Air Pump On |
| 2C | SET+ | " | Hours - - How Long Air Pump Off |
| 2D | SET+ | " | Minutes - - How Long Air Pump Off |
| 2E | SET+ | " | Hours - - Time Air Pump Goes On |
| 2F | SET+ | " | Minutes - - Time Air Pump Goes On |
| 3A | SET+ | COMPRESSOR | Hours - - How Long Compressor OFF |
| 3B | SET+ | " | Minutes - - How Long It Is OFF |
| 3C | SET+ | " | Hours - - How Long Compressor Active |
| 3D | SET+ | " | Minutes - - How Long Compressor Active |
| 3E | SET+ | " | Hours - - Time Compressor OFF |
| 3F | SET+ | " | Minutes - - Time Compressor OFF |

Programming: The Details

Setting the Clock

The first thing you will do is set the clock to your time zone. The clock in the SIP Module is a 24-hour clock—therefore, 2:00 PM=14:00.

Figure 21A:
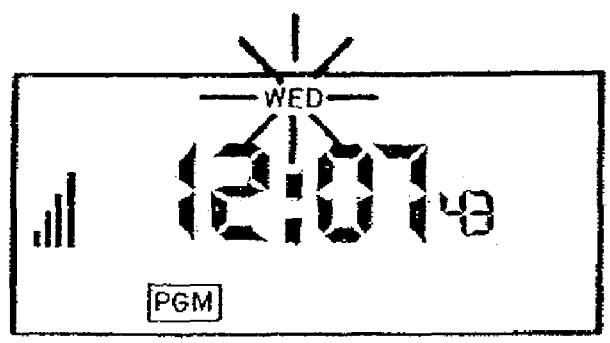

To begin programming, press the "Set+" button 220A. Note the day of the week flashes. (FIG. 21A). Again, the "SET+" button 220A ENTERS the number AND moves you to the next function Press the "+" button 220C or the "−" button 220D until the correct day of the week is displayed (flashing). Please note that the words are listed as the first three letters of the English language days of the week.

Press the "SET+" 220A button when you have the correct day and note that the day of the week stops flashing. Now the hour flashes. You have moved from setting the day of the week to setting the hour. Press the "+" button 220C or the "−" button 220D until the correct hour is displayed. (Remember, this is a 24-hour clock—so 4:00 PM is 16:00.)

Figure 21B:
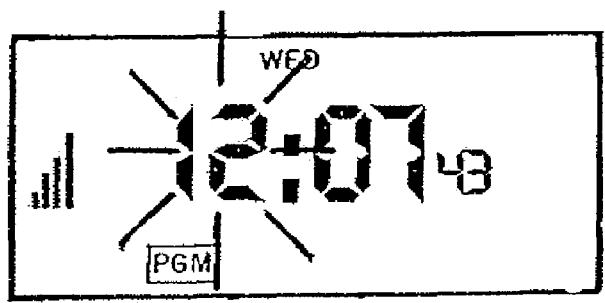

The hour flashing during programming (FIG. 21B).

Press the "SET+" button 220A again once you have the correct hour for the time. Now, note that the minutes are flashing. Press the "+" button 220C or the "−" button 220D until the correct minutes are displayed.

Press "SET+" 220A again and note that the seconds are flashing. Pressing the "+" button 220C or the "−" button 220D will reset the seconds to zero.

You have now set the clock to your time zone.

You are now ready to begin the programming of the SIP 1000. After you set the clock, you will set the time for three different options of programming. The first programming option is for the ozone control (when it comes on, how long it's on for, etc.). The second programming option controls the air pump. The third option controls the cooler's compressor (optional).

Figure 22A:
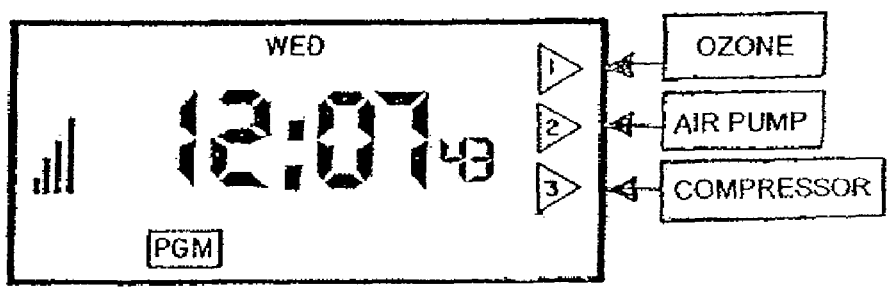

The SIP 1000 shows triangles along the right side of the display to show which of the three programming options you are setting (see illustration below—FIG. 22A). During programming, only one of these triangle is visible at a time.

Before you begin, determine how long you wish to circulate ozone into the cooler's reservoir, what time you'd like this cycle to turn on, and if you'd like a dissipation cycle.

EXAMPLE: This manual will use an example where the SIP 1000 will ozonate the cooler's reservoir every night at 2:00 AM for 5 minutes. Then, it will dissipate the ozone in the reservoir for an additional 5 minutes. It will also turn the compressor off one hour before the ozonation cycle and keep it off until the dissipation cycle is over.

Figure 22B:
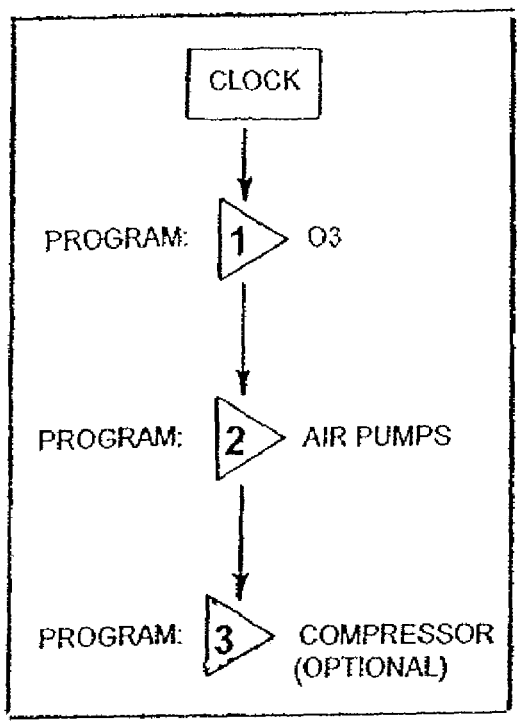

Function Sequence of SIP 1000 (FIG. 22B).

Programming Step 1

Programming the O3

If the SIP 1000 is in the Clock state, you'll need to press "SET+" 220A five times until you notice triangle #1 (ozone production) in the upper right of the display. You'll also see that ON become visible at the bottom of the display while the hours flash.

Figure 23A:
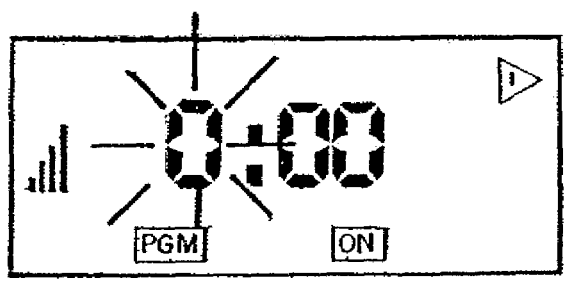

The Display When Programming Ozone Functions (Triangle #1) (FIG. 23A).

Step 1A:

Just like the clock, press the "+" or "−" button 220C,220D to set the AMOUNT OF TIME (HOURS) that ozone will be produced. (This would rarely be used except for severe ozonation as most cycles take only minutes.

Step 1B:

Press "SET+" 220A again and notice the minutes flashing (see below). Press + or − 220C,220D to set the length of time the ozonator is to run.

Figure 23B:
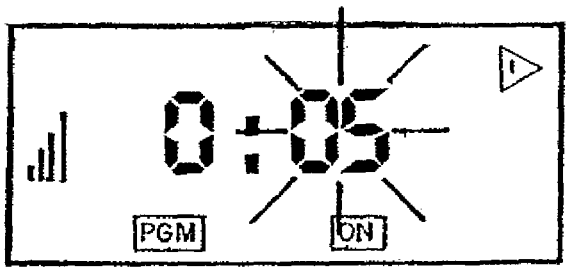

Programming Ozone Run Time—0:05 Minutes (FIG. 23B).

EXAMPLE: In our example, we want the SIP 1000 to sanitize the reservoir for 5 minutes. So you'd push the "+" or "−" buttons 220C,220D until 0 was programmed in for the hours and 05 was programmed in for the minutes.

Figure 23C:
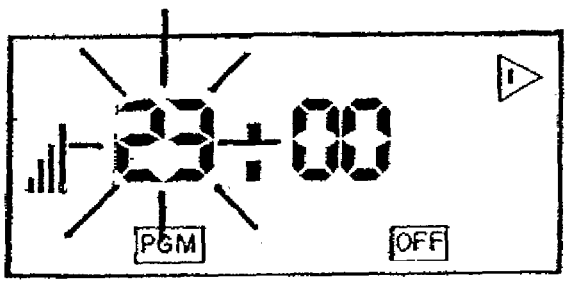

Step 1C:

Press "SET+" 220A again and notice that the hours start flashing and "OFF" becomes visible at the bottom of the display. (FIG. 23C).

Step 1D:

Press the "+" or "−" buttons 220C,220D to set the AMOUNT OF TIME THAT THE OZONE WILL BE OFF (how long before the next run time). First enter the hours. Press the "SET+" 220A button and then program in the minutes (again using the "+" or "−" buttons).

Figure 23D:
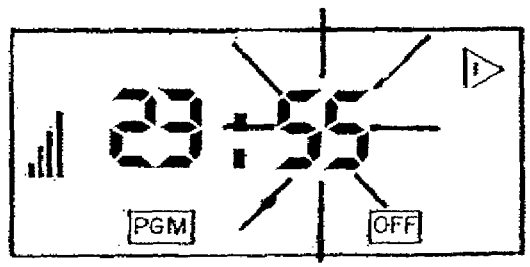

The Ozone is on for 0:05 Minutes—Therefore, It's Off for 23:55 (FIG. 23D).

(We created this step in the programming to allow someone to ozonate every few days.)

EXAMPLE So, in our example, we wanted a daily cycle of 5 minutes. We set the ON time for 00:05 minutes and the OFF time for 23:55 (24:00 hours minus 0:05 minutes).

Step 1E:

Press "SET+" 220A again and notice START appears in the lower part of the display. You told the SIP 1000 how long you want it to ozonate, how long you want it to wait between ozonation cycles—now you are going to program what time it comes on.

Figure 23E:
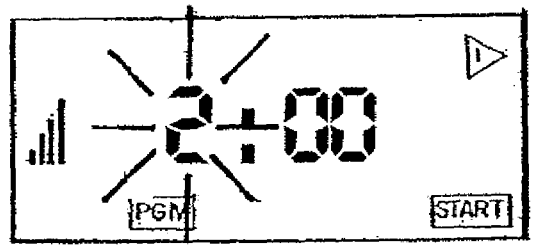

Programming in the Hours For The Ozonation Start Time (FIG. 23E).

Press the "+" or "−" buttons 220C,220D for the hours.

Step 1F:

Enter "SET+" 220A. Then, use the "+" or "−" buttons 220C,220D for the minutes until the clock time for desired start is shown.

EXAMPLE: In our example, we would set the time to 2:00 (see below—FIG. 23F).

Figure 23F:

The SIP 1000 set to turn on the Ozone at 2:00 AM (FIG. 23F).

Programming Step #2

Programming the AIR PUMP

Programming the Air Pump is separate from programming the Ozone production. Step 1 only programmed the SIP 1000 to make Ozone—not circulate it into the reservoir. Step 2 controls the air pump—which has two functions:

Forcing air through the SIP 1000—which converts oxygen in the air (O2) to activated oxygen (O3)

Forcing air into the reservoir (after the ozonation function turns off) to dissipate any ozone residual.

So, to calculate the amount of time that your air pump is on, you have to add the amount of time you will onzonate the reservoir to the amount of time you will dissipate (if at all).

Programming Step 2 and Step 3 are exactly the same sequence as Step 1—it's just that they control different things.

Step 2A:

Press "SET+" 220A again and notice that triangle #2 (air pump) appears in the right of the display and ON becomes visible at the bottom of the display while the hours flash.

Figure 24A:
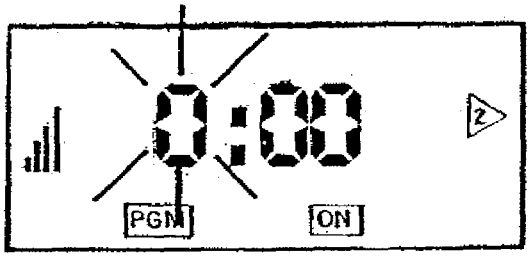

Programming the Air Pump (Triangle #2) (FIG. 24A).

Press the "+" or "−" buttons 220C,220D to set the amount of time—in hours—that the air pump would be ON. (Again you would rarely ozonate for more than a few minutes—but it's been built into the SIP 1000 just in case).

Step 2B:

Press "SET+" 220A again and notice the minutes flashing. Press "+" or "−" 220C,220D to set the length of time (minutes) that the air pump is to run.

You'll need to set the air pump to run for AT LEAST the same amount of time as your ozonation cycle (from Step 1).

To get total Air Pump Time—you will need to ADD the (number of minutes that you'd like to ozonate) to (the number of minutes that you'd like to dissipate the water into the reservoir).

Figure 24B:
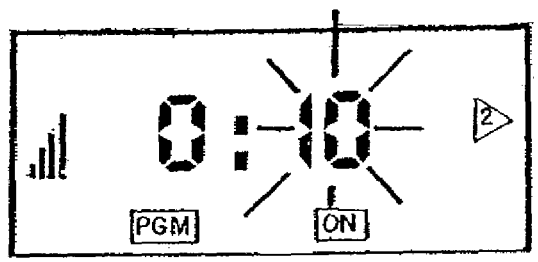

Air Pump (Triangle #2) Set To Run (On) For 10 Minutes (FIG. 24B).

EXAMPLE: Our example called for a 5-minute ozonation and then a 5-minute dissipation cycle. Since the air pump is used for both of these functions, you'll need to set the ON TIME to 10 minutes.

Figure 24C:
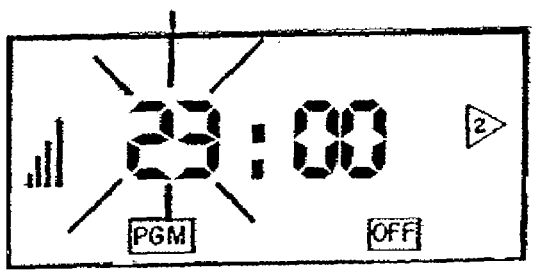

Step 2C:

Press "SET+" 220A again and notice "OFF" becomes visible at the bottom of the display. You now need to program in how long you want the air pump to be off. Press the "+" or "−" buttons 220C,220D to set how long (in hours) before the next run time. (FIG. 24C).

Step 2D:

Press "SET+" 220A again and then use the "+" or "−" buttons 220C,220D to set how long (in minutes) before the next run time.

EXAMPLE: Since the example calls for the air pump to run for 10 minutes, the OFF TIME will be set for 23:50.

Figure 24D:
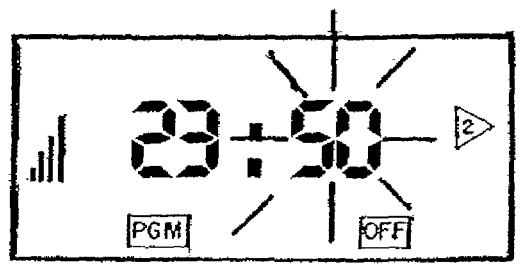

Air Pump Set To Stay Off For 23:50 (FIG. 24D).

Step 2E:

Press "SET+" 220A again and notice START appears in the lower display. Press the "+" or "−" buttons 220C,220D to program the TIME (hours) that you want the AIR PUMP to START.

You have to make certain that the OZONE and AIR PUMP have the same start time.

Figure 24E:
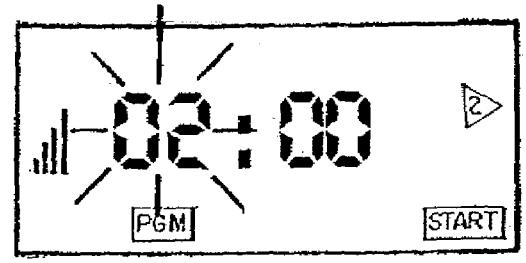

EXAMPLE: In our example, we would set the time to 2:00 (just like Step 1E& 1F) (FIG. 24E).

Figure 24F:
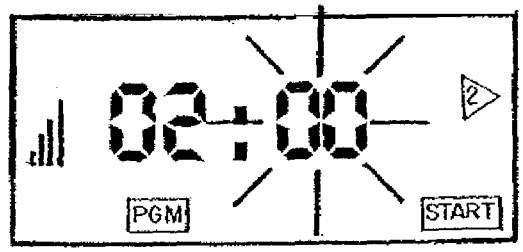

Step 2F:

Press "SET+" 220A again and press the "+" or "−" buttons 220C,220D to program in the TIME (minutes) that you want the AIR PUMP to START. (FIG. 24F).

EXAMPLE: In our example, we would set the time to 2:00 (just like Step 1F).

Programming Step #3

Programming Compressor Control

Some water coolers make ice inside the reservoir to make sure that the customers get a very cold drink of water. You have the option of having the SIP 1000 control the water cooler's compressor—to shut it off in advance of the ozonation cycle. This would insure that all of the ice melted before the ozonation cycle. Even though frozen water is unfriendly to bacteriological growth, you could make sure that every drop of water in the reservoir went through the sanitation process.

Step 3A:

Press "SET+" 220A again and notice that triangle #3 (water cooler compressor control) appears in the right of the display and ON becomes visible at the bottom of the display while the hours flash.

Figure 25A:
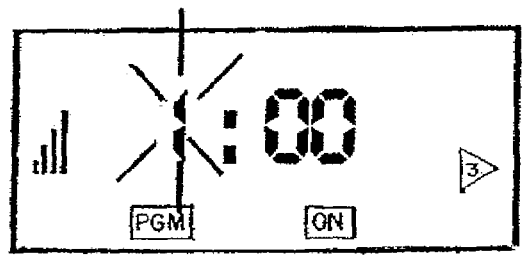
Figure 25B:
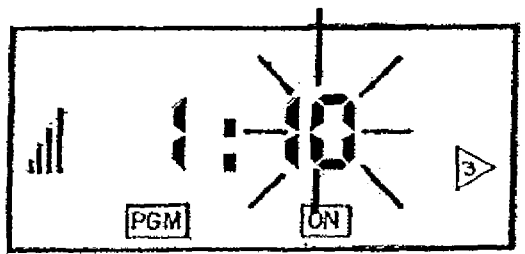

Programming the Compressor Control (FIG. 25A).

Press the "+" or "−" buttons 220C,220D to set the amount of TIME (hours) that you want the SIP 1000 to take control of your cooler's compressor.

The time that you set here will determine HOW LONG YOUR COMPRESSOR WILL BE OFF.

Step 3B:

Press "SET+" 220A again and notice the minutes flashing. Press "+" or "−" 220C,220D to program in the TIME (minutes) that you want the water cooler compressor is shut down.

Figure 25C:
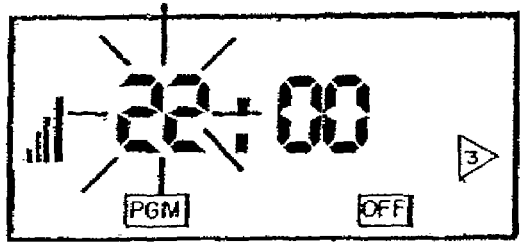

EXAMPLE: Since the example calls for the compressor to shut off one hour in advance of the ozonation cycle—and stay off during both the ozonation and dissipation cycle—the TIME will be set to 01:10 (one hour before plus 5-minute ozonation cycle plus 5-minute dissipation cycle). (FIG. 25C).

Step 3C:

Press "SET+" 220A again and notice "OFF" becomes visible at the bottom of the display. As with steps 1C and 2C, you will now program in how long (in HOURS) the COMPRESSOR CONTROL is OFF.

Press the "+" or "−" buttons 220C,220D to set how long (in hours) before the next run time.

EXAMPLE: In our example, we would set the "wait time" to 22:50—since the SIP 1000 takes control of the compressor for 1 hour and 10 minutes. (FIG. 25C).

Figure 25D:
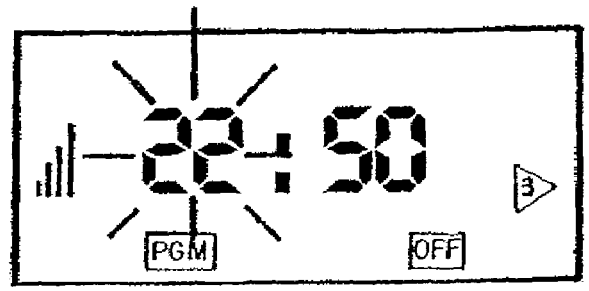

Step 3D:

Press "SET+" 220A again—and then use the "+" or "−" buttons 220C,220D to set how long (in minutes) before the next time that the SIP 1000 would take control of your compressor. (FIG. 25D).

Step 3E:

Press "SET+" 220A again and notice START appears in the lower display.

Figure 25E:
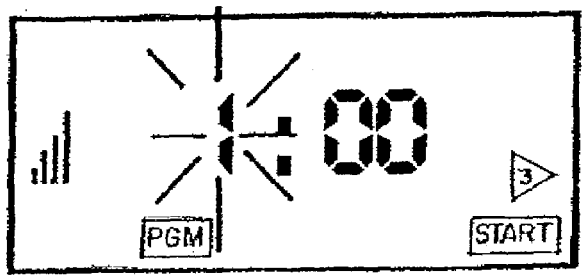

Press the "+" or "−" buttons 220C,220D to program in the TIME (hours) that you want the SIP 1000 to start to take control of the water cooler's compressor (by turning the compressor off). (FIG. 25E).

EXAMPLE: In our example, we would set the time at 1:00 since we wanted the SIP 1000 to take control of (turn off) the compressor at 1:00 AM.

Step 3F:

Press "SET+" 220A again and press the "+" or "−" buttons 220C,220D to program in the TIME (minutes) that you want the COMPRESSOR to START.

Figure 25F:
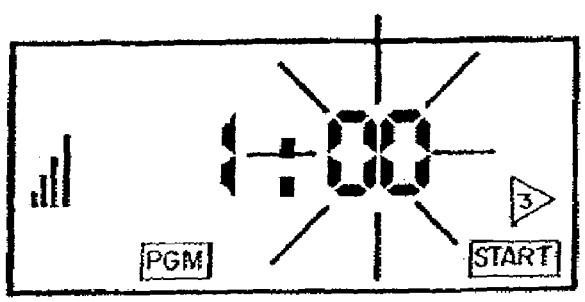

Programming The minutes Of The Compressor Control (FIG. 25F).

When programming is all done, nothing will be flashing and the time will be displayed (Clock State).

Figure 25G:
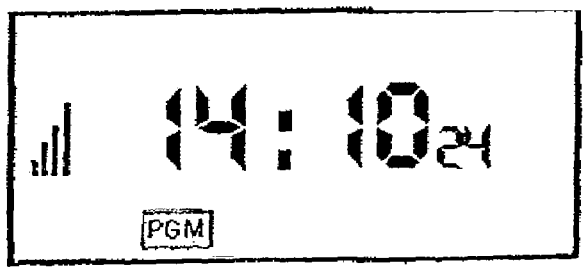

Please make sure that the SIP 1000 is set to PGM (press the "+" button 220C when in the Clock State). (FIG. 25G).

SIP 2000 Operation and Programming Manual

Figure 26:
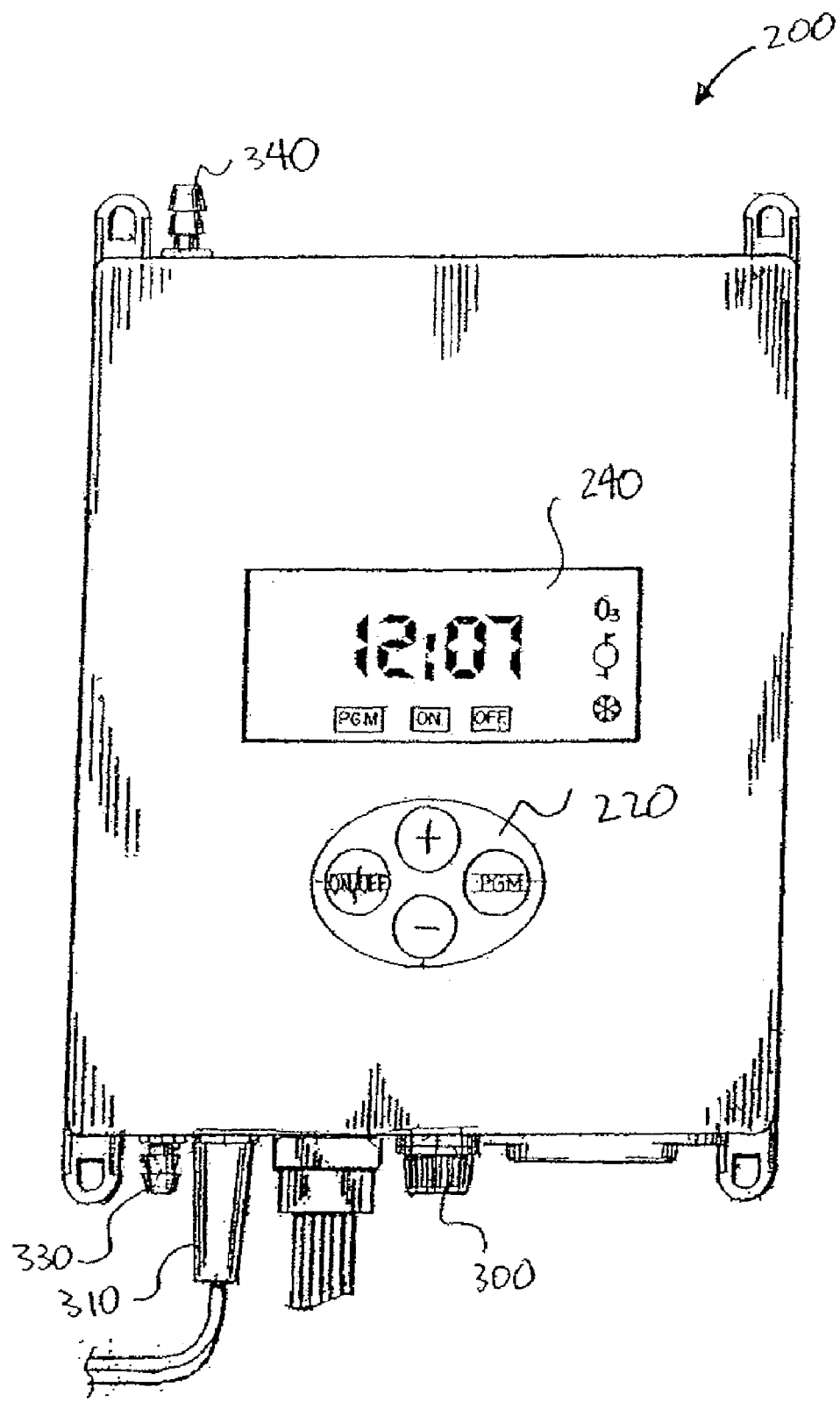

I. Parts of SIP 2000 (see FIG. 26)

Figure 27:
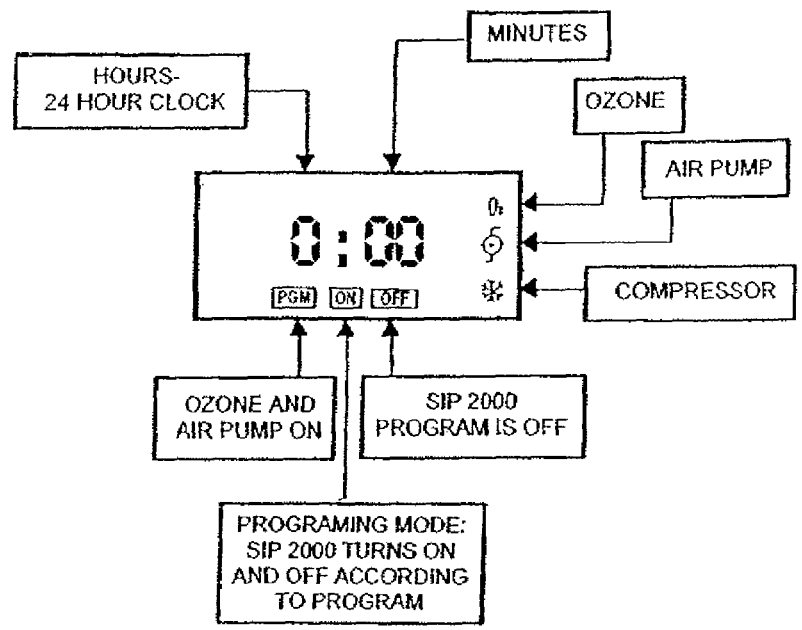

II. Description of Function Signs of the SIP2000 Display Screen (See FIG. 27)

The SIP2000 display screen adopts LCD backlight display with data legible and clear.

The main functions include the function of displaying standard time and displaying the status of each function when setting the functions of $O_3$, bump and water dispenser, when makes it convenient and easy to operate. In addition, the working status of SIP 2000 will be displayed by the external indicator light equipped by our factory. For more information, refer to item 4 Description of External Indicator Lights.

Figure 28:
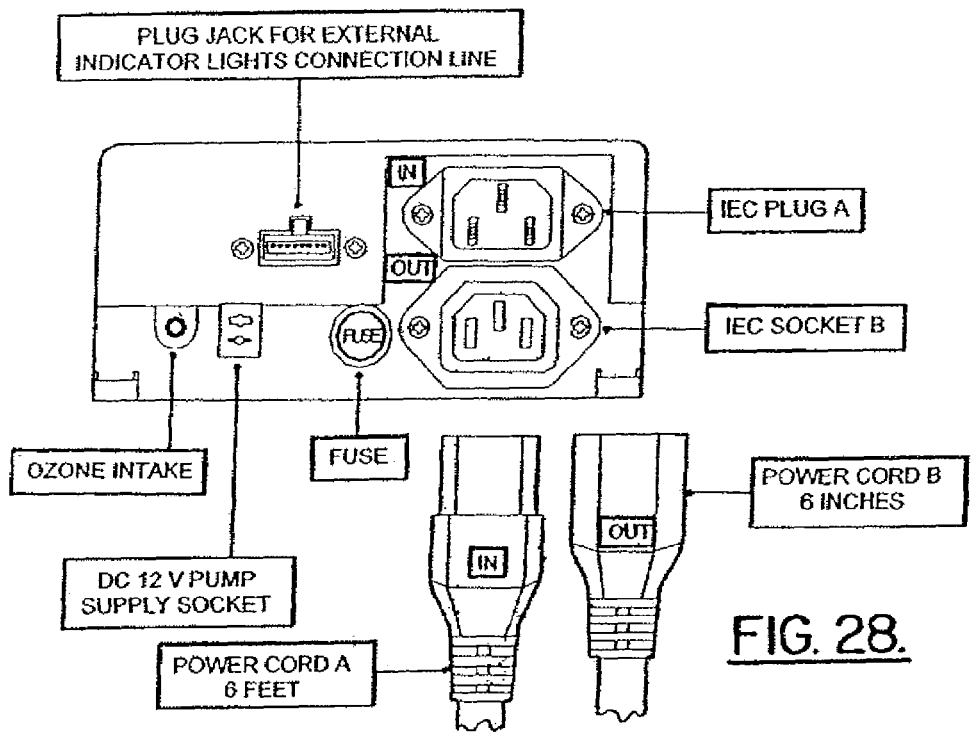

III. Description of Function Plug Jack of SIP2000 (See FIG. 28)

The function plug jacks of this machine are reasonably distributed and convenient for operation. For operation, insert power cord A (with red mark) into the IEC Plug A (with the corresponding red mark), with the other end of the cord connected to electric supply. Insert power cord B (with green mark) into the IEC socket B (with the corresponding green mark), with the other end of the cord connected with the load (the water dispenser). Note that the plug jacks of indicator light and bump should be plugged with the right direction. FUSE is near the socket, making it more elegant and beautiful in appearance as well as more convenient to change.

Figure 29:
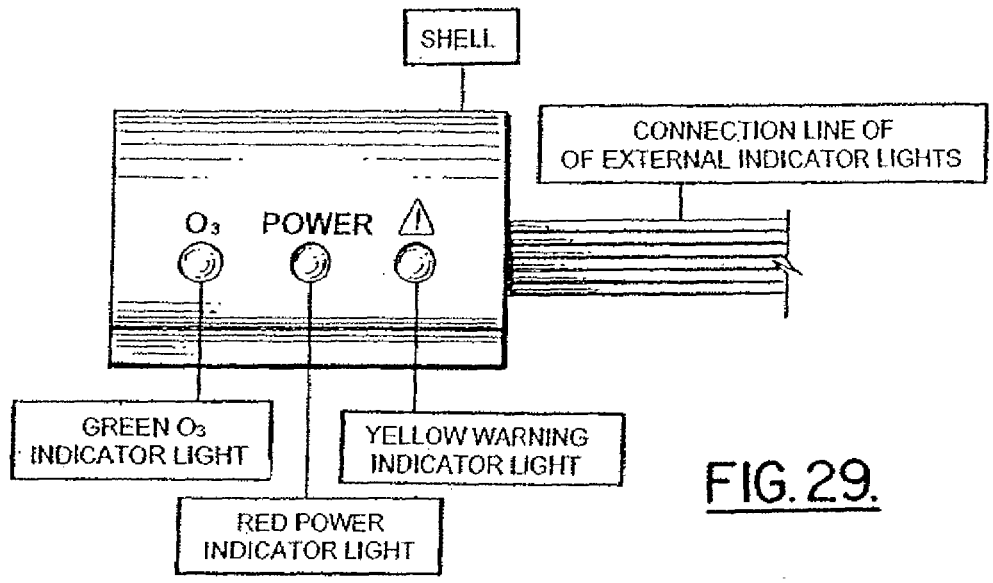

IV. Description of External Indicator Lights of SIP2000 (See FIG. 29)

Note that this external indicator lights, different from the LCD display screen, are only used to display the working status of all functions when the SIP2000 machine is in normal operation. The green light is the $O_3$ indicator light which turns on when $O_3$ is in operation. The red light is the power indicator light which will turn on when it is connected to the power supply. It will go out only when there is a power cut. The yellow light is the warning indicator light which will turn on when there is a power cut or something wrong with the $O_3$ inside the SIP machine. The external indicator light are connected to the SIP plug jack with the external connector line with a length of 1 meter. The lights can be placed in front of the water dispenser, at its side or somewhere else the clients prefer.

V. Outline of Function Keys

Figure 30:
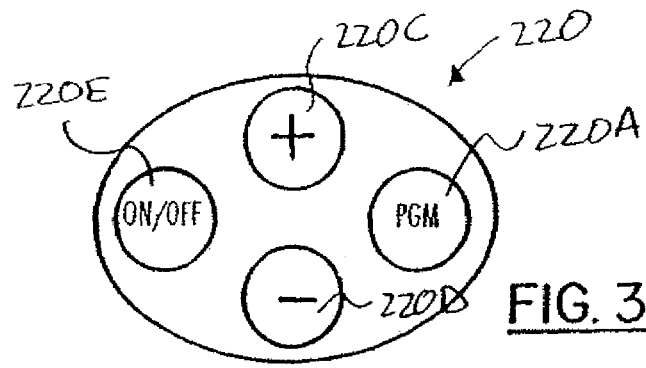

There are 4 keys (see FIG. 30) 220A,220C,220D,220E below the front display window to set the standard time, the function setting of $O_3$, pump and water dispenser and serve as the reset key when the yellow indicator light turns on at the time when a power cut takes place.

Reset key 220E for power cut and the yellow indicator light turning on; start-up and unlocking key for $O_3$, pump and water dispenser setting.

Function key 220A for time and function settings.

Press + or − 220C,220D to set time or data.

V. Operation of Function Setting

Example of setting of adjusting time from the originally set 00:00 to 22:10.

A. Time Adjustment

Figure 31A:
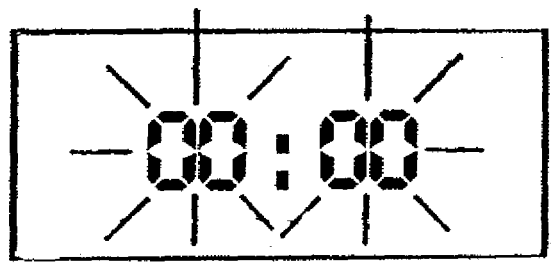
Figure 31B:
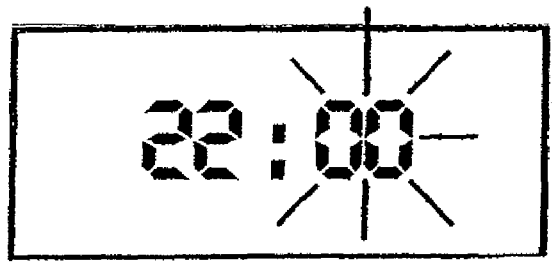
Figure 31C:
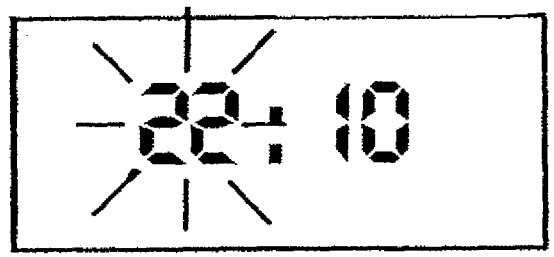
Figure 31D:
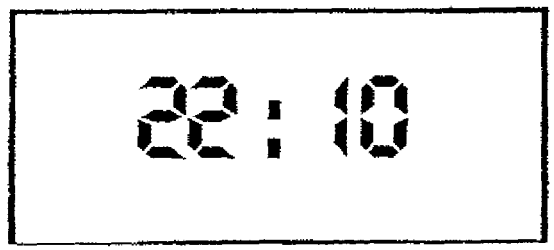

1. Press the PGM key 220A, the time blinks and shows the original time setting. (FIG. 31A).
2. Press + or − key 220C,220D to set the hour section (the hour section stops blinking while the minute section blinks). Se the desired standard hour time, i.e. 0~24 hours. (FIG. 31B).
3. Press the PGM key 220A to confirm the above setting and shift to the minute section setting (the hour section blinks and the minute section stops blinking). (FIG. 31C). Press + or − key 220C,220D to set the desired standard time, the is 0~60 minutes.
4. Press the PGM key 220A to confirm the minute section setting and it will show the time, indicating that the setting is completed. (FIG. 31D). The time section does not blink and shows the current setting time. If there is a fault setting or it needs to be reset, press PGM key again to reset the time.

B. Example of Setting Operation

Figure 32A:
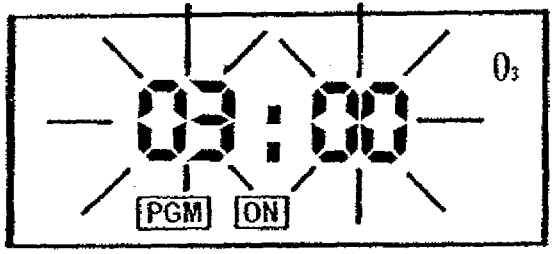
Figure 32B:
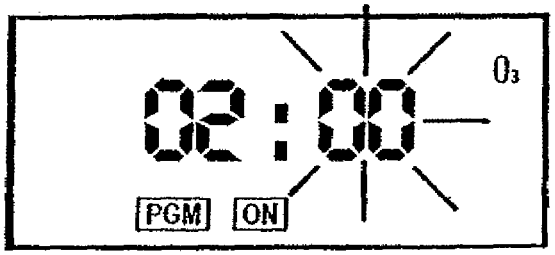
Figure 32C:
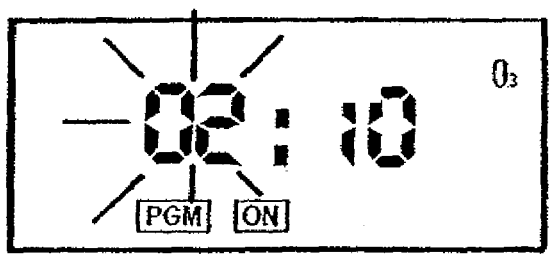
Figure 32D:
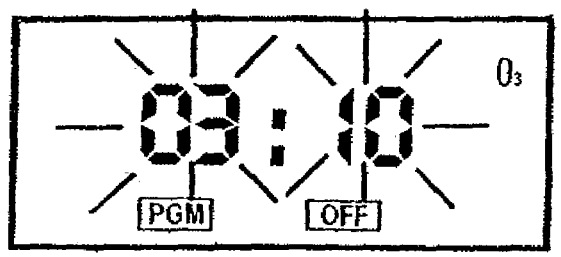
Figure 32E:
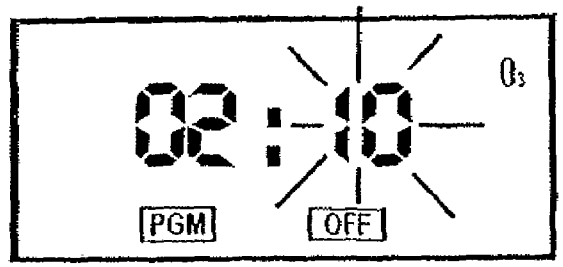
Figure 32F:
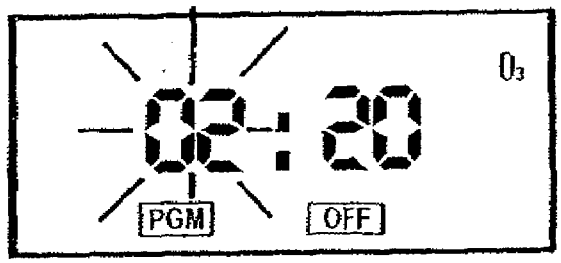
Figure 33A:
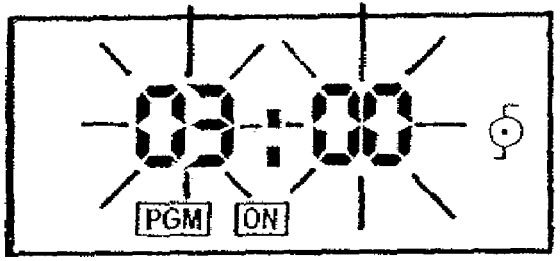
Figure 33B:
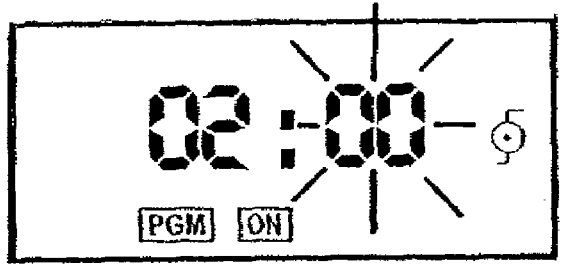
Figure 33C:
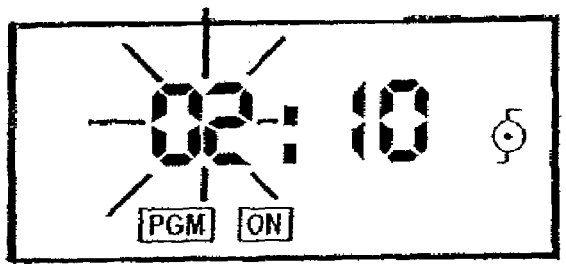
Figure 33D:
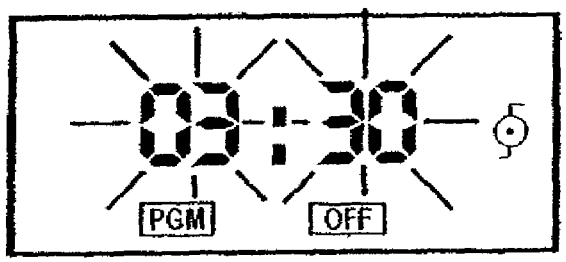
Figure 33E:
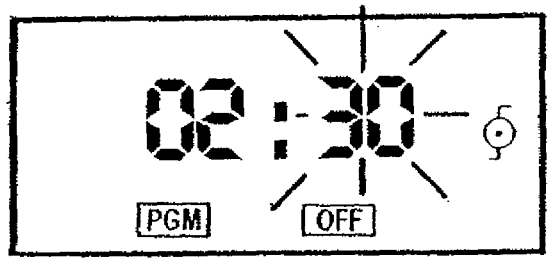
Figure 33F:
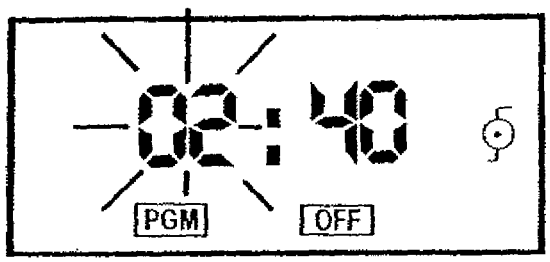
Figure 34A:
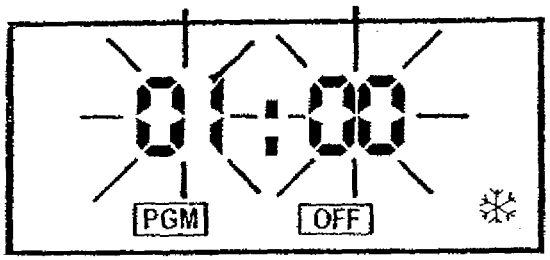
Figure 34B:
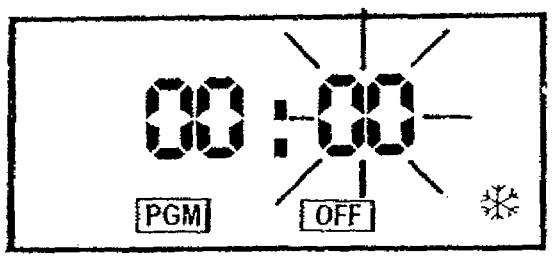
Figure 34C:
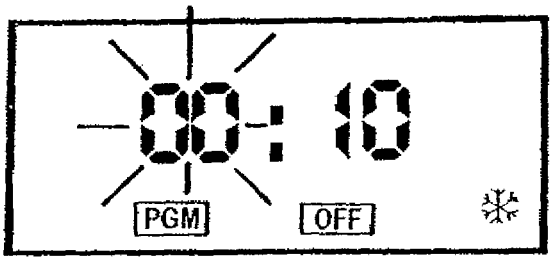

Adjust the following factor setting data:
(1) $O_3$ 03:00 a.m. on, 03:10 a.m. off
(2) pump 00 a.m. on, 03:30 a.m. off
(3) water dispenser 01:00 a.m. off, 03:30 a.m. on to the required data of the example:
(1) $O_3$ 02:10 a.m. on, 02:20 a.m. off
(2) pump 10 a.m. on, 02:40 a.m. off
(3) water dispenser 00:00 a.m. off, 02:40 a.m. on The adjusting process is as follows:

1. Press ON/OFF 220E and PGM 220A key simultaneously for 3s, the time section will display the factory setting of $O_3$ start-up and operation time data and it blinks and displays the PGM, ON and $O_3$ signs. (FIG. 32A). First set the $O_3$ start-up and operation time.
2. Press + or − key 220C,220D to set the hour section of the $O_3$ start-up and operation time, i.e., 0~24 hours, the time section does not blink while the minute section blinks. (FIG. 32B).
3. Press the PGM key 220A to confirm the above setting and shift to minute section setting. Press + or − key 220C, 220D to set the minute section of $O_3$ start-up and operation time, that is 0~60 minutes. The hour section starts blinking and the minute section stops blinking. (FIG. 32C).
4. Press PGM key 220A to confirm the above setting and shift to the setting of $O_3$ shutdown time. The screen will display the factory setting of $O_3$ shutdown time and the PGM, OFF and $O_3$ signs. (FIG. 32D).
5. Press + or − key 220C,220D to set the hours section (0~24 hours) of $O_3$ shutdown time. The hour section does not blink and the minute section blinks. (FIG. 32E).
6. Press PGM key 220A to confirm the setting of step 5 and shift to the setting of minute section of $O_3$ (OFF). Press + or − key 220C,220D to set the minute section (0~60 minutes) of $O_3$ shutdown time. The hour section blinks and the minutes section stops blinking. (FIG. 32F).
7. After the above settings are confirmed, press PGM key 220A to shift to the setting of the pump operation time. It will display the original factory setting of the pump and the signs of PGM, ON and P. (FIG. 33A).
8. Press + or − key 220C,220D to set the hour section (0~24 hours) of the pump start-up and operation time. The hour section doesn't blink while the minute section starts blinking. (FIG. 33B).
9. Press the PGM key 220A again to confirm the setting of step 8 and shift to the setting of the minute section. Press + or − key 220C,220D to set the minute section (0~60 minutes) of the pump start-up and operation time. The hour section blinks and the minute section doesn't blink. (FIG. 33C).
10. Press PGM key 220A to confirm the setting of step 9 and shift to the setting of the pump shutdown time. It will display the signs of PGM, OFF, P and the original factory setting and blinks. (FIG. 33D).
11. Press + or − key 220C,220D to set the hour section (0~24 hours) of the pump shutdown time. The hour section doesn't blink while the minute section blinks. (FIG. 33E).
12. Press PGM key 220A to confirm the setting of step 11 and shift to the minute section setting of the pump shutdown time. (FIG. 33F). Press + or − key 220C,220D to set the minute section (0~60 minutes).
13. Press PGM key 220A to confirm the above setting (pump setting) and shift to the setting of the water dispenser operation time. It will display the setting of the water dispenser shutdown time originally set by the factor as will as the PGM, OFF and COMPRESSOR signs. (FIG. 34A).
14. Press + or − key 220C,220D to set the hour section of the water dispenser shutdown time. The hour section does not blink while the minute section blinks. (FIG. 34B).
15. Press PGM key 220A to confirm the setting of step 14 and shift to the minute section setting of the water dispenser shutdown time. Press + or − key 220C,220D to set the minute (0~60 minutes). The hour section blinks while the minute section does not. (FIG. 34C).

Figure 34D:
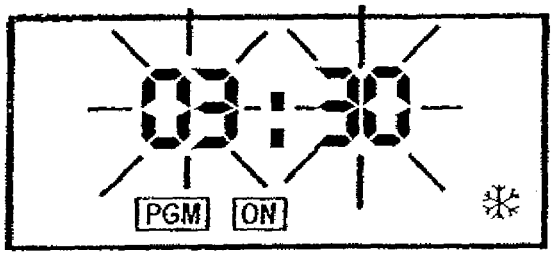

16. Press PGM key 220A to confirm the above setting and shift to the setting of water dispenser operation time. It will display the original factory setting of start-up and operation time. (FIG. 34D).

Figure 34E:
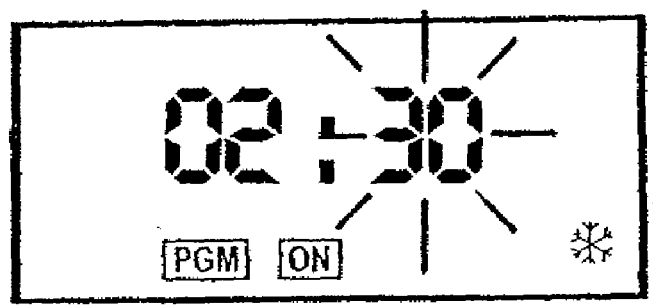

17. Press + or − key 220C,220D to set the hour section (0~24 hours) of the water dispenser start-up and operation time. The hour section will not blink and the minute section blinks. (FIG. 34E).

Figure 34F:
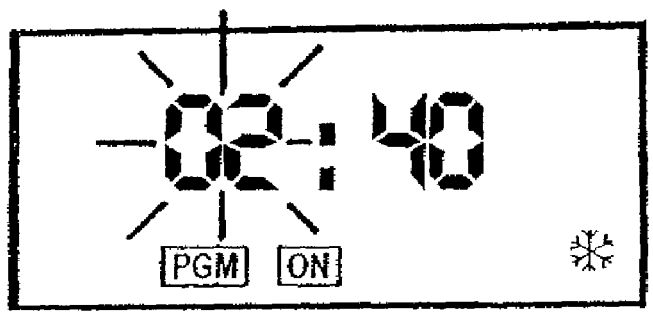

18. Press PGM key 220A to confirm the setting of step 17 and shift to the minute section setting of the water dispenser start-up operation time. Press + or − key 220C,220D to set the minute section (0~60 minutes). The hour section blinks and the minute section does not. (FIG. 34F).

Figure 34G:
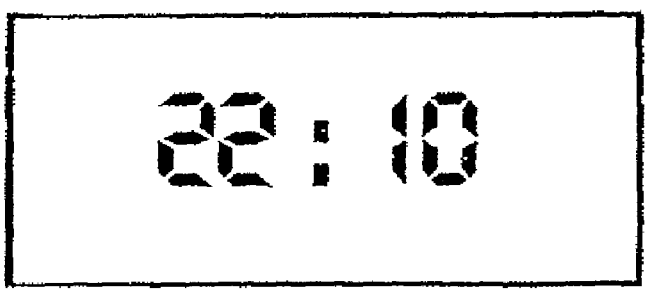

19. Press PGM key 220A to complete the setting, and the standard time display will work. (FIG. 34G).

VII. Display of Working Status of SIP 2000

If connected to power, the red external indicator light will turn on when SIP2000 is in operation, showing that the machine is electrified. The green indicator light will shine when $O_3$ is in operation. When there is a power cut, the yellow indicator light will turn on. Press ON/OFF reset key to turn off the yellow indicator light. When there is malfunction with the $O_3$ inside the SIP2000, the yellow indicator light will shine showing that something is wrong inside the SIP2000 machine. Call the maintenance personnel to deal with it.

It is preferred that components approved by United Laboratories (UL approved) be used for as many components as possible.

The following is a list of reference numerals:

LIST FOR REFERENCE NUMERALS

| (Part No.) | (Description) |
|---|---|
| 10 | water dispenser |
| 15 | reservoir |
| 16 | interior |
| 17 | reservoir sidewall |
| 18 | reservoir bottom wall |
| 19 | water level |
| 20 | cabinet |
| 22 | electrical line |
| 24 | plug |
| 30 | lower end portion |
| 32 | compressor |
| 34 | cooling coils |
| 35 | flow line |
| 36 | flow line |
| 40 | upper end portion |
| 50 | cover |
| 60 | opening |
| 70 | annular flange |
| 80 | gasket |
| 90 | spigot |
| 92 | spigot |
| 96 | flow line |
| 100 | bottle |
| 102 | water level in bottle |

LIST FOR REFERENCE NUMERALS -continued

| (Part No.) | (Description) |
|---|---|
| 110 | bottle neck |
| 200 | controller |
| 202 | circuit diagram |
| 204 | circuit board |
| 210 | casing |
| 212 | mounting bracket |
| 220 | programmable input |
| 230 | remote programmable input |
| 240 | display |
| 242 | ozone indicator |
| 244 | gas flow indicator |
| 246 | compressor indicator |
| 248 | clock |
| 250 | remote display |
| 252 | ozone indicator |
| 254 | power indicator |
| 256 | error indicator |
| 260 | output for remote display |
| 270 | support connectors |
| 280 | power input |
| 282 | plug |
| 290 | power output |
| 300 | electrical fuse |
| 310 | power for pump |
| 330 | gas input |
| 340 | gas output |
| 400 | pump |
| 410 | input for pump |
| 420 | filter |
| 422 | cap |
| 430 | output for pump |
| 440 | tubing |
| 500 | first output tubing |
| 510 | low permeability filter |
| 520 | second output tubing |
| 530 | diffuser |
| 600 | ozone generator |
| 610 | heat sink for ozone generator |
| 620 | control circuit for universal voltage converter |
| 630 | backup battery |
| 640 | control circuit for ozone generation |
| 650 | control circuit for air generation |
| 660 | control circuit for compressor power |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

TABLE 1

| APPLICANT | Tianjin Vitashower International Trading Co. |
|---|---|
| PRODUCT | Ozone Generator |
| MODEL | OG-01 |
| DATE | 2004-03-18 |

TABLE 1-continued

| COMPONENT | COMPONENT AMOUNT | COMPONENT NO. | RATINGS | MODEL | MANUFACTURER | UL FILE No. |
|---|---|---|---|---|---|---|
| 1 Enclosure | 1 | | UL94V-0 | ABS-I 94V-0 | NINGBO XINGAO PLASTIC & CHEMICAL INDUSTRY CO LTD 0769-6632563 | E169305 |
| 2 Power Line | 1 | | 10 A/220 VAC4 | SVT | Kuen San Apollo Wire & Cable Co., Ltd | E55351 |
| 3 Heat Shrinkable acridine | 2 | | VW-1 | PHI-3 PHI-4 | Shenzhen Woer Heat-Shrinkable Material Co Ltd | E203950 |
| 4 cable bug | 3 | | 10 A | RF250F | SUZHOU YUAN LI METAL ENTERPRISE CO LTD | E185793 E186611 |
| 5 Fuse holder | 1 | | 10 A/250 V | H3-12 | GUOMIN HUANG ELECTRIC APPLIANCE CO LTD | E223587 |
| 6 Fuse | 1 | | 2 A/250 V | PHI-5x20 | SHENZHEN LANSON ELECTRONICS CO. LTD | E221465 |
| 7 RELAY | 1 | K1 | 240 VAC/10 A | J108-1C | DONGGUAN WANJIA RELAY CO LTD | E196453 |
| 8 Printed circuit board | 1 | | 110 × 133 | | HEBEI HANGLING CIRCUIT BOARD CO LTD | E235546 |
| 9 Timer Controler | 1 | | | | SHENZHEN SHIDAIZONGHENG-TECH EXPLOITURE CO., LTD | |
| 10 Integrated Switcher Off-line | 1 | U1 | | TOP245Y | Power Integrations | |
| 11 Transistor | 4 | Q1 Q7 Q8 Q9 | | 9014 | Fairchild Semiconductor | |
| 12 Power Transistor | 1 | Q10 | | TIP31C | Fairchild Semiconductor | |
| 13 Power MOSFET | 3 | Q4 Q5 Q6 | 100 V | IRF540 | International Rectifier | |
| 14 Power MOSFET | 2 | Q2 Q3 | −100 V | IRF9540N | International Rectifier | |
| 15 Timer | 2 | U3 U4 | | NE5555 | National Semiconductor | |
| 16 Optical isolators | 1 | U2 | | H11A817 | Fairchild Semiconductor | |
| 17 Rectifier | 4 | D1 D2 D3 D4 | 1.0 A/1000 V | 1N4007 | SHANGHAI RIGHTKING INC. | |
| 18 Rectifier | 1 | D13 | 1.0 A/400 V | 1N4004 | SHANGHAI RIGHTKING INC. | |
| 19 Fast Switching Diodes | 7 | D6 D7 D8 D9 D10 D11 D12 | | 1N4148 | Fairchild semiconductor | |
| 20 Rectifier | 1 | D5 | | UF4005 | SHANGHAI RIGHTKING INC. | |
| 21 Transient surge suppressors voltage | 1 | ZD1 | 200 V | P6KE200 | Fairchild Semiconductor | |
| 22 Zener diode | 1 | ZD2 | 10 V/5 mA | 1N5240 | Thomson Corporation (ST) | |
| 23 Zener diode | 1 | ZD3 | 3.9 V/5 mA | 1N5228 | Thomson Corporation (ST) | |
| 24 Schottky Rectifier | 1 | SD1 | 10 A/100 V | STP20S100 | Thomson Corporation (ST) | |
| 25 Ceramic capacitor | 1 | C9 | 470 pF/50 V DC | 0805N471J | GUANGDONG ZHAOQING ZHIZHUO ELECTRONIC CO LTD | |
| 26 (MKT) capacitor | 1 | C18 | 0.1 uF/250 V DC | 1206Y104M | GUANGDONG ZHAOQING ZHIZHUO ELECTRONIC CO LTD | |
| 27 Ceramic capacitor | 6 | C4 C10 C11 C14 C15 C17 | 0.1 uF/50 V DC | 0805Y104M | GUANGDONG ZHAOQING ZHIZHUO ELECTRONIC CO LTD | |
| 28 Ceramic capacitor | 1 | C5 | 1 uF/50 V DC | 0805Y105M | GUANGDONG ZHAOQING ZHIZHUO ELECTRONIC CO LTD | |
| 29 capacitor | 1 | C8 | 2.2 nF/1 KV DC | CT81-1KV-222 | MCHANGZHOU JIAGUAN ELE ELECTRONICS FACTORY | |
| 30 capacitor | 1 | C1 | 0.1 uF/250 V AC | X2-0.1M-300V AC P*10 | CHIEFCON ELECTRONICS CO LTD | E209251 |
| 31 capacitor | 1 | C3 | 47 uF/35 V DC | CD263 | NANTONG JIANGHAI CAPACITOR FACTORY | |
| 32 capacitor | 1 | C2 | 100 uF/400 VDC | CD294 | NANTONG JIANGHAI CAPACITOR FACTORY | E227010 |
| 33 capacitor | 4 | C6 C7 C13 C16 | 470 uF/35 V DC | CD263 | NANTONG JIANGHAI CAPACITOR FACTORY | |
| 34 capacitor | 1 | C12 | 100 uF/50 V DC | CD263 | NANTONG JIANGHAI CAPACITOR FACTORY | |
| 35 inductance | 1 | T1 | 22 mH/1 A | VTCLB12-22 | TIANJIN VENTECH ELECTRONIC CO., LTD | E184446 (C) E187200 (C) |
| 36 transformer | 1 | T2 | | VTCEE25-19 | TIANJIN VENTECH ELECTRONIC CO., LTD | E184445 (C) E187200 (C) |
| 37 transformer | 1 | T3 | | VTC BT-2 | TIANJIN VENTECH ELECTRONIC CO., LTD | E184446 (C) E187200 (C) |
| 38 Resistor | 1 | R3 | 2M/0.5 W | | GUANGDONG ZHAOQING ZHIZHUO ELECTRONIC CO LTD | |

TABLE 1-continued

| No. | Component | Qty | Ref | Value | Model | Manufacturer | Code |
|---|---|---|---|---|---|---|---|
| 39 | Resistor | 1 | R1 | 4.7M/0.5 W | | GUANGDONG ZHAOQING ZHIZHUO ELECTRONIC CO LTD | |
| 40 | Resistor | 2 | R2 R10 | 9.1K/0.25 W | | GUANGDONG ZHAOQING ZHIZHUO ELECTRONIC CO LTD | |
| 41 | Resistor | 2 | R4 R5 | 150 OHMS/0.25 W | | GUANGDONG ZHAOQING ZHIZHUO ELECTRONIC CO LTD | |
| 42 | Resistor | 1 | R6 | 33 OHMS/0.25 W | | GUANGDONG ZHAOQING ZHIZHUO ELECTRONIC CO LTD | |
| 43 | Resistor | 3 | R16 R18 R19 | 10K/0.25 W | | GUANGDONG ZHAOQING ZHIZHUO ELECTRONIC CO LTD | |
| 44 | Resistor | 2 | R11 R13 | 20K/0.25 W | | GUANGDONG ZHAOQING ZHIZHUO ELECTRONIC CO LTD | |
| 45 | Resistor | 1 | R12 | 3K/0.25 W | | GUANGDONG ZHAOQING ZHIZHUO ELECTRONIC CO LTD | |
| 46 | Resistor | 2 | R14 R21 | 100K/0.25 W | | GUANGDONG ZHAOQING ZHIZHUO ELECTRONIC CO LTD | |
| 47 | Resistor | 1 | R22 | 200 OHMS/0.25 W | | GUANGDONG ZHAOQING ZHIZHUO ELECTRONIC CO LTD | |
| 48 | Resistor | 3 | R8 R9 R23 | 1K/0.25 W | | GUANGDONG ZHAOQING ZHIZHUO ELECTRONIC CO LTD | |
| 49 | Resistor | 1 | R7 | 400 OHMS/0.25 W | | GUANGDONG ZHAOQING ZHIZHUO ELECTRONIC CO LTD | |
| 50 | Variable resistor | 1 | R15 | 200K | EVND8AA-200K | PANASONIC SEMICONDUCTOR COMPANY | |
| 51 | Lithium Battery | 1 | BT1 | 3.6 V/950 mAH | ER14250 | WUHAN FUTE TECHNOLOGY CO LTD | MH20923 |
| 52 | Ribbon Wire | 1 | | 17/0.16 | 1.27-10 P | CHINA LONSID ELECTRIC CO LTD | E205056 |
| 53 | 10 PIN | 2 | | 10P | UL2651 VW-1 | NS-TECH CO LTD SHENZHEN | E225927 |
| 54 | 10 PIN Socket | 2 | | 10++ | 3025-10 P | NS-TECH CO LTD SHENZHEN | E225927 |
| 55 | DC Socket | 1 | D14 LED | DC12 V | DS-313 | SHENZHEN RISEDONE ELECTRONIC CO LTD | |
| 56 | Pump Socket | 1 | | AC12 V | | SHENZHEN XINGRISHENG INDUSTRY CO LTD | E154283 E203950 |
| 57 | Heat Sink | 3 | | 30 × 25 × 30 15 × 10 × 25 | 44-DAR 213-DHE | ZHENJIANG YAOU HEAT SINK FACTORY | |
| 58 | Glass Tube | 1 | | | PHI-5 × 1 | BEIJING GLASS INSTRUMENT FACTORY | |
| 59 | Clip | 2 | J26 J27 | | PHI-5 × 30 | YUEYI ELECTRONIC CO LTD | |
| 60 | Silicone Rubber Tube | 2 | | | PHI-4 × 6 | JIANGSU TIANMA ELECTRONIC EQUIPMENT FACTORY | |

TABLE 2

Model: SIP

| No. | Component | Models | Quantity |
|---|---|---|---|
| | A Detailed List of Components and Parts | | |
| 1 | Diodes | 4007 | 6 |
| 2 | | 4148 | 8 |
| 3 | | P6KE200A | 1 |
| 4 | Voltage Regulator Tubes | 3.9 V | 1 |
| 5 | | 10 V | 1 |
| 6 | Metallic Resistors | 2K | 5 |
| 7 | | 10K | 6 |
| 8 | | 1K | 6 |
| 9 | | 100K | 4 |
| 10 | | 100 OHMS | 1 |
| 11 | | 200 OHMS | 1 |
| 12 | | 33K | 1 |
| 13 | | 3.3M | 2 |
| 14 | | 4.7M | 1 |
| 15 | | 2.2M | 1 |
| 16 | | 20K | 5 |
| 17 | | 150 OHMS | 2 |
| 18 | | 9.1K | 1 |
| 19 | Variable Resistors | 200K | 1 |
| 20 | Ceramic Chip Capacitors | 222/1 KV | 1 |
| 21 | | 105/1 KV | 1 |
| 22 | | 104/1 KV | 9 |
| 23 | | 9014 | 14 |
| 25 | | 9012 | 1 |
| 26 | Electrolytic Capacitors | 100 μf/400 V | 1 |
| 27 | | 1000 μf/35 V | 1 |
| 28 | | 47 μf/50 V | 1 |
| 29 | Electrolytic Capacitors | 4.7 μf/50 V | 1 |
| 30 | | 0.01 μf/250 V | 1 |
| 31 | Power MOSFET | IRF530N | 3 |
| 32 | | IRF9530N | 2 |
| 33 | Power Supply | IC TOP245Y | 1 |
| 34 | Power Tubes | TIP41C | 1 |
| 35 | Power Tubes | STP20S | 1 |
| 36 | Flat Back Transformers | VTCBT-2 | 1 |
| 37 | Impulse Transformers | VTCEE25-19 | 1 |
| 38 | Wave Filtering Coils | VTCCB12-22 | 1 |
| 39 | NE | 555 | 3 |
| 40 | PC | 817 | 1 |
| 41 | Relays | 240 VAC/10 A | 1 |
| 42 | Battery | 3.6 V/950 mAH | 1 |
| 43 | Ribbon wire | 101W-10 P | 1 |
| 44 | Plugs | 10 pins 101W-10 P | 2 |
| 45 | Sockets | 10 pins 302S-10 P | 2 |
| 46 | A.C Sockets (Air pump) | DS-313 | 1 |
| 47 | Cooling Plates | 44-DAR | 3 |
| 48 | Printed Circuit Boards | 12 × 13 | 1 |
| 49 | | 50 × 84 | 1 |

TABLE 2-continued

Model: SIP

| No. | Component | Models | Quantity |
|---|---|---|---|
| 50 | Fuse Clamps | | 2 |
| 51 | Ozonizer Radiators | | 1 |
| 52 | LCDs | | 1 |
| 53 | Chips | | 1 |
| 54 | 6 × 6 × 10 Switches | | 4 |
| 55 | Capacitors | 104 P | 4 |
| 56 | | 18 P | 2 |
| | Haifend Electrical Appliances Co., Ltd, Cixi City A Detailed List of Components and Parts List | | |
| 1 | Resistors | 100 OHMS | 2 |
| 2 | Crystal Oscillators | | 1 |
| 3 | Backlight Supplies | | 1 |
| 4 | 6-wire Sockets | | 1 |
| 5 | Wire Jump(ers) | | 13 |

The invention claimed is:

1. A water dispenser, comprising:
a) a cabinet having front and rear portions, upper and lower end portions, and an interior;
b) reservoir contained within the cabinet, the reservoir being capable of holding water;
c) at least one spigot in fluid communication with the reservoir for dispensing the water;
d) a refrigeration system for cooling the water within the reservoir;
e) a diffuser contained within the reservoir for emitting bubbles into the reservoir;
f) an ozone generator being operably connected to the diffuser;
g) a pump that is in fluid communication with the ozone generator and the diffuser;
h) a controller operably connected to the ozone generator and pump;
i) wherein the controller includes an input unit for programming the controller and the input unit is located in the front of the cabinet.

2. The water dispenser of claim 1, wherein the controller is located in the rear of the cabinet.

3. The water dispenser of claim 1, wherein timing and duration of ozone generated by the ozone generator and sent to the diffuser is controlled by the controller and activation of the pump is controlled by the controller.

4. The water dispenser of claim 1, wherein the pump is spaced apart from the ozone generator such that air pumped by the pump is allowed to cool down to a temperature near ambient temperature before reaching the ozone generator.

5. The water dispenser of claim 1, wherein the controller is programmable regarding the amount of ozone generated, the amount being chosen from between about 25-100 percent ozone generation.

6. The water dispenser of claim 1, wherein the controller is programmed to have air pumped through the diffuser for a set period of time after ozone generation by the ozone generator is terminated.

7. The water dispenser of claim 1, wherein the controller is operably connected to the refrigeration system and programmable regarding the timing and duration of operation of the refrigeration system.

8. The water dispenser of claim 7, wherein the controller is programmed to shut off the refrigeration system a set period of time before ozone is generated.

9. The water dispenser of claim 1, wherein the controller can be programmed regarding the day of the week.

10. The water dispenser of claim 1, wherein the controller can be programmed for a 24 hour period.

11. The water dispenser of claim 1, further comprising a remote display operable connected to the controller but spaced apart from the controller, the remote display having at least one indicator regarding operation of the controller.

12. The water dispenser of claim11, wherein the indicator is for ozone operation.

13. The water dispenser of claim 12, wherein the remote display includes three indicators, one for ozone, a second for power, and a third for a warning signal.

14. A water dispenser, comprising:
a) a cabinet having front, side, and rear portions, upper and lower end portions, and an interior;
b) reservoir contained within the cabinet, the reservoir being capable of holding water;
c) at least one spigot in fluid communication with the reservoir for dispensing the water;
d) a refrigeration system for cooling the water within the reservoir;
e) a diffuser contained within the reservoir for emitting bubbles into the reservoir;
f) an ozone generator being operably connected to the diffuser;
g) a pump that is in fluid communication with the ozone generator and the diffuser;
h) a controller operably connected to the ozone generator and pump;
i) wherein the controller includes an input unit for programming the controller and the input unit is located in the side of the cabinet.

15. The water dispenser of claim 14, further comprising a remote display operable connected to the controller but spaced apart from the controller, the remote display having at least one indicator regarding operation of the controller.

16. The water dispenser of claim 15, wherein the indicator is for ozone operation.

17. The water dispenser of claim 16, wherein the remote display includes three indicators, one for ozone, a second for power, and a third for a warning signal.

18. The water dispenser of claim 14, wherein the controller is located in the rear of the cabinet.

19. The water dispenser of claim 14, wherein timing and duration of ozone generated by the ozone generator and sent to the diffuser is controlled by the controller and activation of the pump is controlled by the controller.

20. The water dispenser of claim 14, wherein the pump is spaced apart from the ozone generator such that air pumped by the pump is allowed to cool down to a temperature near ambient temperature before reaching the ozone generator.

* * * * *